United States Patent
Kim et al.

(10) Patent No.: US 10,045,243 B2
(45) Date of Patent: Aug. 7, 2018

(54) METHOD AND APPARATUS FOR TRANSMITTING AND RECEIVING DATA, BY TERMINAL, USING MULTIPLE CARRIERS IN MOBILE COMMUNICATION SYSTEM

(71) Applicant: Samsung Electronics Co., Ltd., Suwon-si, Gyeonggi-do (KR)

(72) Inventors: Soeng-Hun Kim, Suwon-si (KR); Gert Jan Van Lieshout, Middlesex (GB); Kyeong-In Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/115,481

(22) PCT Filed: Jan. 29, 2015

(86) PCT No.: PCT/KR2015/000977
§ 371 (c)(1),
(2) Date: Jul. 29, 2016

(87) PCT Pub. No.: WO2015/115835
PCT Pub. Date: Aug. 6, 2015

(65) Prior Publication Data
US 2017/0171768 A1 Jun. 15, 2017

(30) Foreign Application Priority Data
Jan. 29, 2014 (KR) .................. 10-2014-0011640

(51) Int. Cl.
*H04W 40/00* (2009.01)
*H04W 24/10* (2009.01)
*H04W 76/28* (2018.01)
*H04W 16/32* (2009.01)
*H04W 76/04* (2009.01)
(Continued)

(52) U.S. Cl.
CPC ............. *H04W 24/10* (2013.01); *H04L 5/001* (2013.01); *H04W 16/32* (2013.01);
(Continued)

(58) Field of Classification Search
CPC ........................... H04W 24/10; H04W 76/048
(Continued)

(56) References Cited

U.S. PATENT DOCUMENTS

2010/0159950 A1 6/2010 Toh et al.
2011/0319068 A1 12/2011 Kim et al.
(Continued)

FOREIGN PATENT DOCUMENTS

JP 2012-235395 A 11/2012
KR 10-2012-0001273 A 1/2012
(Continued)

*Primary Examiner* — Timothy Pham
(74) *Attorney, Agent, or Firm* — Jefferson IP Law, LLP

(57) ABSTRACT

A method for transmitting and receiving data, by a terminal, using multiple carriers in a mobile communication system according to an embodiment of the present invention comprises the steps of: when measurement is received from a reference base station, checking whether the measurement object indicates serving cells of the terminal; and if the measurement object indicates the serving cells of the terminal, setting a measurement cycle using a discontinuous reception cycle of corresponding cells.

6 Claims, 13 Drawing Sheets

(51) Int. Cl.
*H04L 5/00* (2006.01)
*H04W 88/02* (2009.01)

(52) U.S. Cl.
CPC ......... *H04W 76/048* (2013.01); *H04W 76/28* (2018.02); *H04W 88/02* (2013.01)

(58) Field of Classification Search
USPC ........................................................ 455/449
See application file for complete search history.

(56) References Cited

U.S. PATENT DOCUMENTS

| | | | |
|---|---|---|---|
| 2012/0094607 A1* | 4/2012 | Nakamori | H04W 24/10 455/67.11 |
| 2013/0121204 A1 | 5/2013 | Lee et al. | |
| 2014/0086130 A1 | 3/2014 | Nakamori et al. | |
| 2014/0171086 A1* | 6/2014 | Nakamori | H04W 36/0088 455/436 |
| 2014/0206410 A1 | 7/2014 | Kim et al. | |
| 2015/0087296 A1 | 3/2015 | Kim et al. | |
| 2015/0098379 A1* | 4/2015 | Lunden | H04W 52/0209 370/311 |
| 2016/0183325 A1* | 6/2016 | Harada | H04W 16/32 370/328 |

FOREIGN PATENT DOCUMENTS

| | | |
|---|---|---|
| WO | 2011-105856 A2 | 9/2011 |
| WO | 2012-023733 A2 | 2/2012 |
| WO | 2013-141558 A1 | 9/2013 |

* cited by examiner

METHOD AND APPARATUS FOR TRANSMITTING AND RECEIVING DATA, BY TERMINAL, USING MULTIPLE CARRIERS IN MOBILE COMMUNICATION SYSTEM

PRIORITY

This application is a National Phase Entry of PCT International Application No. PCT/KR2015/000977, which was filed on Jan. 29, 2015, and claims a priority to Korean Patent Application No. 10-2014-0011640, which was filed on Jan. 29, 2014, the contents of which are incorporated herein by reference.

DETAILED DESCRIPTION OF THE INVENTION

Technical Field

The present disclosure relates to a method and apparatus in which a terminal transmits and receives data using multiple carriers in a mobile communication system.

Background Art

In general, a mobile communication system has been developed to provide communications while ensuring a user's mobility. By virtue of the rapid development of technologies, the mobile communication system has evolved to provide high-speed data communication services as well as voice communications.

Recently, the Long Term Evolution (LTE) system which is one of next-generation mobile communication systems is being standardized by the 3rd Generation Partnership Project (3GPP). The LTE system is technology for implementing high-speed packet based communications having transmission speed of maximally 100 Mbps which is higher than a data transfer rate being currently provided, and standardization of the LTE system is almost finished.

Lately, discussions about LTE-Advanced (LTE-A) of improving transmission speed by combining the LTE communication system with various new technologies became regularized. A representative one of the technologies to be newly introduced is Carrier Aggregation (CA). The CA is to enable a terminal to transmit and receive data using multiple downlink carriers and multiple uplink carriers, unlike typical technology of enabling a terminal to transmit and receive data using one downlink carrier and one uplink carrier.

In the LTE-A, only intra-ENB Carrier Aggregation (CA) has been defined. Accordingly, the applicability of the CA is limited, and particularly, in a scenario of overlappingly operating a plurality of pico cells and a macro cell, a problem in which the pico cells cannot be aggregated with the macro cell may occur.

DISCLOSURE

Technical Problem

An aspect of the present disclosure provides a method and apparatus in which a terminal transmits and receives data using multiple carriers in a mobile communication system.

Another aspect of the present disclosure provides a method in which a terminal measures a serving cell and a peripheral cell to transmit and receive data using multiple carriers.

Technical Solution

In accordance with an aspect of exemplary embodiments of the present disclosure, there is provided a method in which User Equipment (UE) transmits and receives data using a plurality of carriers in a mobile communication system, including: determining, if a measurement instruction is received from reference Evolved Node B (ENB), whether a measurement object indicates at least one serving cell of the UE; if the measurement object indicates the at least one serving cell of the UE, setting a measurement cycle using a discontinuous reception cycle of the serving cell.

In accordance with another aspect of exemplary embodiments of the present disclosure, there is provided a method in which reference Evolved Node B (ENB) transmits and receives data using a plurality of carriers in a mobile communication system, including: transmitting a measurement instruction to User Equipment (UE); receiving a measurement report of at least one serving cell of the UE measured in a measurement cycle decided based on a discontinuous reception cycle of the serving cell; and receiving a measurement report of at least one peripheral cell of the UE measured in a measurement cycle decided based on a discontinuous reception cycle of the reference ENB.

In accordance with another aspect of exemplary embodiments of the present disclosure, there is provided User Equipment (UE) which transmits and receives data using a plurality of carriers in a mobile communication system, including: a controller configured to determine, if a measurement instruction is received from a reference Evolved Node B (ENB) through a transceiver, whether a measurement object indicates at least one serving cell of the UE, and to set a measurement cycle using a discontinuous reception cycle of the serving cell if the measurement object indicates the at least one serving cell of the UE.

In accordance with another aspect of exemplary embodiments of the present disclosure, there is provided reference Evolved Node B (ENB) using a plurality of carriers in a mobile communication system, including a transceiver configured to transmit a measurement instruction to User Equipment (UE), to receive a measurement report of at least one serving cell of the UE measured in a measurement cycle decided based on a discontinuous reception cycle of the serving cell, and to receive a measurement report of at least one peripheral cell of the UE measured in a measurement cycle decided based on a discontinuous reception cycle of the reference ENB.

Advantageous Effects

According to the embodiments of the present disclosure, by aggregating carriers between different base stations, the transmission/reception speed of a terminal can be improved

BEST MODE

Figure 1:
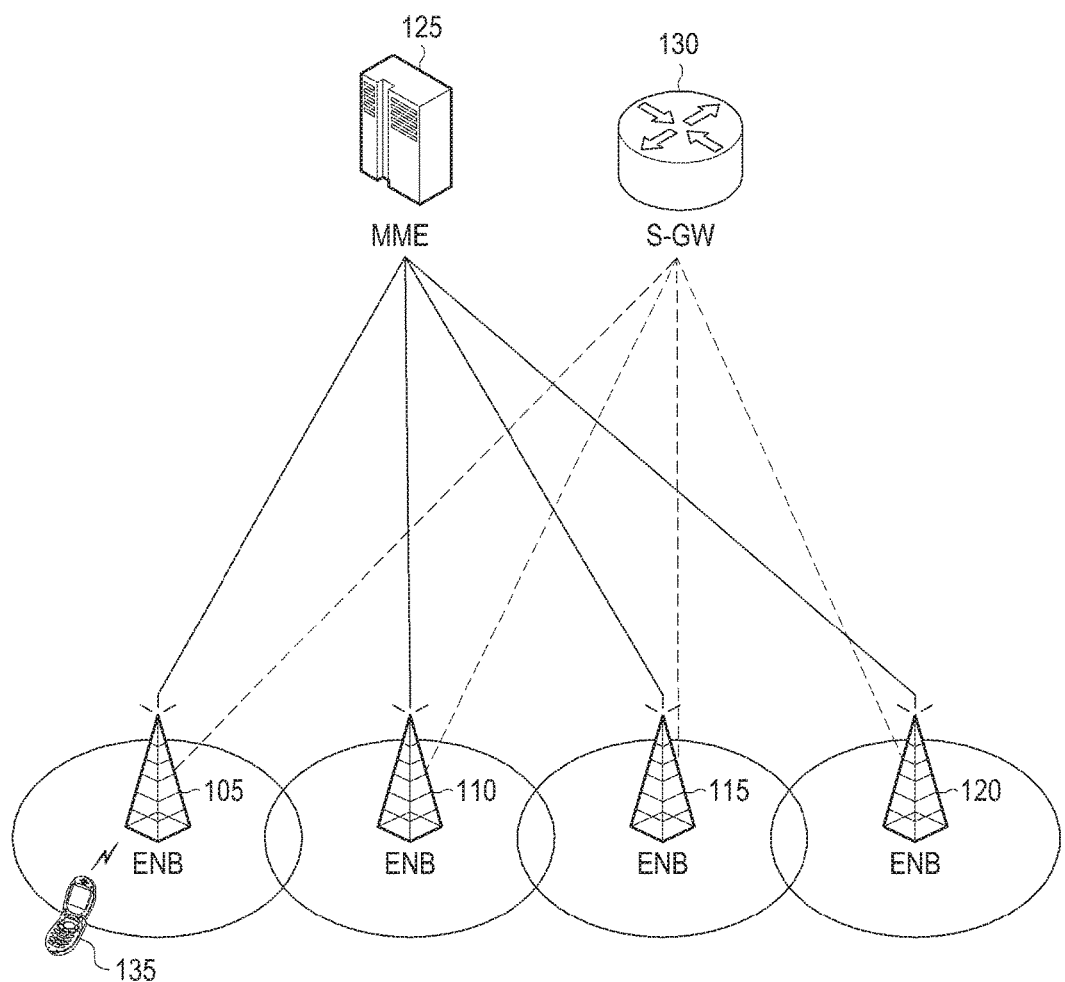
FIG. 1 shows a configuration example of a general Long Term Evolution (LTE) system.

Now, the operation principle of preferred embodiments of the present disclosure will be described in detail with reference to the accompanying drawings. Throughout the drawings, like reference numerals will be understood to refer to like components. In the following description of the present disclosure, a detailed description of known functions and configurations incorporated herein will be omitted when it may obscure the subject matter of the present disclosure. Also, terms used in the present disclosure are terms defined in consideration of the functions in the present disclosure; however, they may be changed according to a user's or operator's intention, the practice, or the like. Hence, the terms must be defined based on the contents of the entire specification, not by simply stating the terms themselves.

FIG. 1 shows a configuration example of a general Long Term Evolution (LTE) system.

Referring to FIG. 1, a Radio Access Network (RAN) of a LTE system may include next-generation Evolved Node Bs (hereinafter, referred to as "ENBs", "Node Bs", or "base stations") 105, 110, 115, and 120, Mobility Management Entity (MME) 125, and Serving-Gateway (S-GW) 130. User Equipment (hereinafter, referred to as "UE" or "terminal") 135 may connect to an external network through the ENBs 105, 110, 115, and 120 and the S-GW 130.

In FIG. 1, the ENBs 105, 110, 115, and 120 may correspond to typical Node B of Universal Mobile Telecommunications System (UMTS). The ENBs 105, 110, 115, and 120 may connect to the UE 135 through a radio channel, and perform more complicated functions than the typical Node B. In the LTE system, all user traffics including a real-time service such as Voice over IP (VoIP) through an internet protocol may be serviced through a shared channel Therefore, an apparatus of scheduling by collecting state information of UEs, for example, the buffer states, available transmission power states, channel states, etc. of the UEs may be needed, and the ENBs 105, 110, 115, and 120 may be in charge of such scheduling. Generally, each of the ENBs 105, 110, 115, and 120 may control a plurality of cells. In order to implement transmission speed of 100 Mbps, the LTE system may use Orthogonal Frequency Division Multiplexing (OFDM) as radio access technology at a bandwidth of 20 MHz. Also, each of the ENBs 105, 110, 115, and 120 may perform Adaptive Modulation & Coding (AMC) of deciding a modulation scheme and a channel coding rate in correspondence to the channel state of the UE 135.

The S-GW 130 may provide a data bearer, and may create or remove a data bearer under the control of the MME 125. The MME 125 may be in charge of various control functions as well as a mobility management function for the UE 135, and may be connected to a plurality of eNBs, for example, the ENBs 105, 110, 115, and 120.

Figure 2:
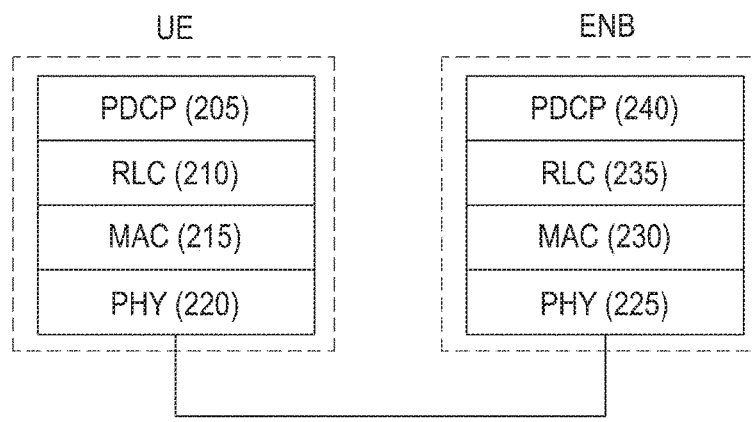
FIG. 2 shows an example of a radio protocol structure of a general LTE system.

FIG. 2 shows an example of a radio protocol structure of a general LTE system.

Referring to FIG. 2, a radio protocol of a LTE system may be configured with Packet Data Convergence Protocol (PDCP) 205 and 240, Radio Link Control (RLC) 210 and 235, Medium Access Control (MAC) 215 and 230, and a physical layers (PHY) 220 and 225 in each of UE and ENB.

The PDCP 205 and 240 may be in charge of compression/recovery of an Internet Protocol (IP) header, and the RLC 210 and 235 may reconfigure a PDCP Packet Data Unit (PDU) into an appropriate size, and perform Automatic Repeat reQuest (ARQ) operation. The MAC 215 and 230 may be connected to several RLC layer devices configured in UE, and perform operation of multiplexing RLC PDUs into a MAC PDU and demultiplexing the RLC PDUs from the MAC PDU. The PHY 220 and 225 may perform operation of channel-coding and modulating upper layer data to create an OFDM symbol and transmitting the OFDM symbol through a radio channel, or operation of demodulating and channel-decoding an OFDM symbol received through the radio channel and transferring the OFDM symbol to the upper layer.

Figure 3:
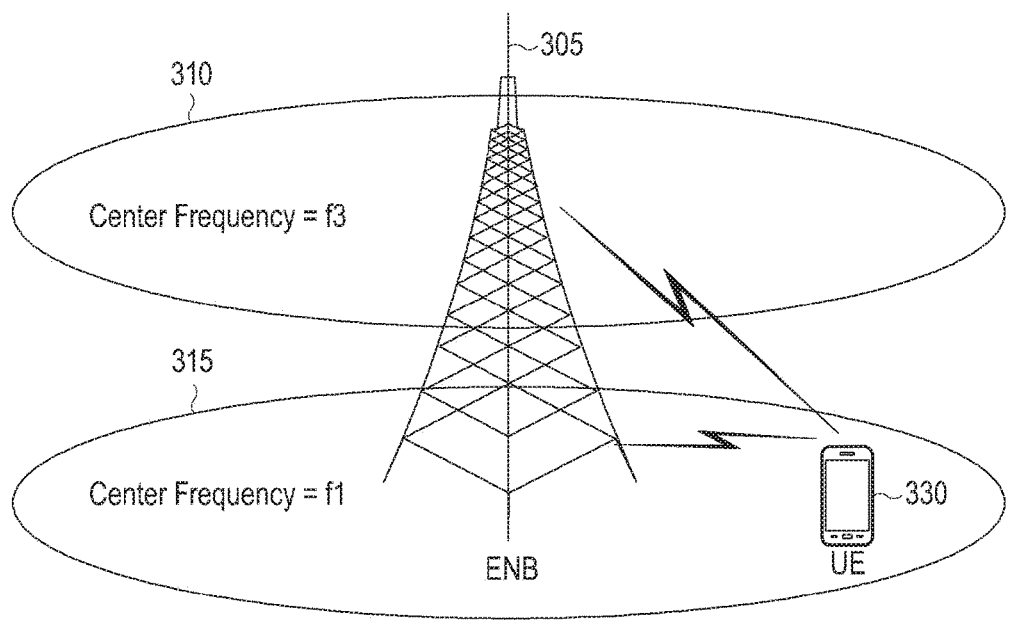
FIG. 3 is a view for describing an example of Carrier Aggregation (CA) in general Evolved Node B (ENB)

FIG. 3 is a view for describing an example of Carrier Aggregation (CA) in general ENB.

Referring to FIG. 3, ENB can transmit and receive multiple carriers generally over several frequency bands. For example, it is assumed that a carrier 315 having a downlink center frequency of f1 and a carrier 310 having a downlink center frequency of f3 are transmitted from ENB 305. In this case, generally, UE may transmit and receive data using one of the carriers 310 and 315. However, UE having CA capability can transmit and receive data through several carriers at the same time. The ENB 305 may assign more carriers to UE (for example, UE 330) having CA capability depending on a situation, thereby increasing transmission speed of the UE 330. As described above, operation of aggregating downlink carriers and uplink carriers transmitted from and received by single ENB is called "intra-ENB CA". However, in some cases, operation of aggregating downlink carriers and uplink carriers transmitted from and received by different ENBs may be required, unlike the example of FIG. 3.

Figure 4:
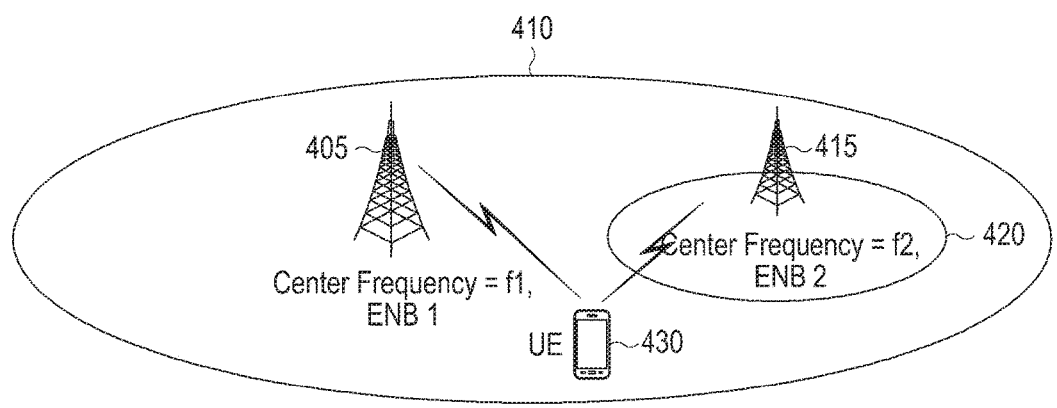
FIG. 4 is a view for describing an example of inter-ENB CA which is CA according to an embodiment of the present disclosure.

FIG. 4 is a view for describing an example of inter-ENB CA which is CA according to an embodiment of the present disclosure.

Referring to FIG. 4, it is assumed that ENB 1 405 transmits and receives a carrier having a center frequency of f1, and ENB 2 415 transmits and receives a carrier having a center frequency of f2. In this case, if UE 430 aggregates the carrier having the downlink center frequency of f1 with the carrier having the downlink center frequency of f2, the UE 430 may result in aggregating carriers transmitted from and received by two ENBs or more. In this specification, this operation is referred to as "inter-ENB carrier aggregation" or "inter-ENB CA". In this specification, the inter-ENB CA is also defined as "Dual Connectivity (DC)". For example, setting DC means setting inter-ENB carrier aggregation.

Hereinafter, terms often used in this specification will be described.

If a downlink carrier transmitted from ENB and a uplink carrier received by the ENB configure a cell, CA can be understood as operation in which UE transmits and receives data through several cells at the same time. At this time, maximum transmission speed and the number of aggregated carriers may have positive correlation.

Hereinafter, in this specification, that UE receives data through an arbitrary downlink carrier or transmits data through an arbitrary uplink carrier has the same meaning as that the UE transmits and receives data using a control channel and a data channel that are provided from a cell corresponding to a center frequency and a frequency band characterizing the carrier. In this specification, particularly, the CA will be referred to as "a plurality of serving cells are set", and terms, such as a Primary serving Cell (PCell), a Secondary serving Cell (SCell), or an activated serving cell, will be used. The terms have the same meanings as those used in the LTE mobile communication system. In the present disclosure, terms, such as a carrier, a component carrier, and a serving cell, may be interchanged with each other.

In this specification, a group of serving cells that are controlled by the same ENB may be defined as a cell group (CG) or a carrier group. The cell group may be classified into a Master Cell Group (MCG) and a Secondary Cell Group (SCG). The MCG means a group of serving cells that are controlled by ENB (that is, Master ENB (MeNB)) controlling a PCell. Also, the SCG means a group of serving cells that are controlled by ENB (that is, Slave ENB (SeNB)) controlling only SCells, not the ENB controlling the PCell. Whether a predetermined serving cell belongs to a MCG or a SCG may be informed to UE by ENB when the ENB sets the corresponding serving cell. A MCG and one or more SCGs may be set for UE. In the current embodiment, for convenience of description, a case in which a SCG is set for UE is considered, however, the technical concept of the present disclosure can also be applied without any modification to a case in which one or more SCGs are set for UE. PCell and SCell are terms indicating the kinds of serving cells set for UE. There are several differences between PCell and SCell. For example, the PCell is always maintained in an activated state, and the SCell changes between an activated state and a deactivated state according to an instruction from ENB. Mobility of UE may be controlled based on a PCell, and a SCell can be understood as an additional serving cell for data transmission/reception. In this specification, PCell and SCell mean PCell and SCell defined in the LTE standard 36.331, 36.321, etc.

In an embodiment of the present disclosure, a macro cell and a pico cell are considered. The macro cell, which is controlled by macro ENB, may provide a service over a relatively wide area. In contrast, the pico cell, which is controlled by SeNB, may provide a service over a significantly narrow area compared to a typical macro cell. Although there is no strict criteria for distinguishing the macro cell from the pico cell, it can be assumed that the area of a macro cell has a radius of about 500 m and the area of a pico cell has a radius of about several tens of meters. In this specification, the pico cell may be interchanged with the macro cell.

Referring to FIG. 4, it can be assumed that ENB 1 405 is MeNB and ENB 2 415 is SeNB. In this case, a serving cell 410 having a center frequency of f1 belongs to a MCG, and a serving cell 420 having a center frequency of f2 belongs to a SCG.

In the following description, other terms, instead of the MCG and SCG, may be used. For example, terms, such as a "primary set", a "secondary set", a "primary carrier group", and a "secondary carry group", may be used. However, although such other terms are used, the meanings of the terms are the same as those of the MCG and SCG. The main use purpose of the terms is to represent what cell is controlled by ENB controlling a PCell of specific UE. Depending on whether or not the cell is controlled by the ENB controlling the PCell of the specific UE, operation methods of the UE and the corresponding cell may vary.

One or more SCGs may be set for single UE, however, in the present disclosure, for convenience of description, it is assumed that maximally one SCG can be set for UE. The SCG may be configured with several SCells, wherein one of the SCells may have a special attribute.

In typical intra-ENB CA, UE may transmit Hybrid ARQ (HARQ) feedback and Channel State Information (CSI) for SCell, as well as HARQ feedback and CSI for PCell, through a Physical Uplink Control Channel (PUCCH) of the PCell. The reason is to apply CA to UE disallowing uplink simultaneous transmission. Herein, the PUCCH, which is a uplink control channel, may transmit control information such as HARQ feedback. The format of the PUCCH may follow the standard 36.211, 212, or 213.

In the case of inter-ENB CA, transmitting HARQ feedback and CSI of CSG SCells through a PUCCH of a PCell may be impossible practically. The reason is because the HARQ feedback needs to be transmitted within HARQ Round Trip Time (RTT, about 8 ms), but a transfer delay between MeNB and SeNB may be longer than the HARQ RTT.

Due to the transfer delay, a PUCCH transfer resource may be set in a special one of SCells belonging to a SCG, and HARQ feedback, CSI, etc. for the SCG Scells may be transmitted through the PUCCH. The special SCell will be referred to as a primary SCell (pSCell).

In a mobile communication system such as the LTE, UE may perform measurement for a serving cell and a peripheral cell at a predetermined measurement cycle, process and evaluate the measured values, and transmit a measurement report message to ENB according to the results of the evaluation. The predetermined measurement cycle may have positive correlation to a degree of battery consumption and measurement accuracy of the UE. That is, as the UE performs measurement more often, the measurement accuracy and battery consumption of the UE may increase.

In the mobile communication system, reducing the battery consumption of the UE is an important issue. Since the UE does not always transmit data to or receive data from the ENB although the UE operates in connection to the ENB, discontinuous reception operation may be set for the UE connected to the ENB. The UE which operates in a discontinuous reception state (DRX) may receive downlink signals discontinuously at its own discontinuous reception cycle, thereby reducing battery consumption. If the UE set to the discontinuous reception operation performs measurement often, the advantage of battery saving that is expected to be obtained through the discontinuous reception operation may be diluted. Accordingly, a measurement cycle of such UE may be decided in consideration to the discontinuous reception cycle. For example, if a discontinuous reception cycle of UE is assumed to be x ms, a measurement cycle of the UE may be decided as x*5 ms. The measurement cycle is not a cycle at which the UE performs measurement practically, but a cycle at which a physical layer device of the UE reports a measurement result to a RRC layer device. Hereinafter, for convenience of description, the measurement cycle can be interchanged with a measurement report cycle. The UE may acquire 5 measurement samples for each measurement report cycle. In other words, the physical layer of the UE may perform measurement 5 times for each measurement report cycle, and a cycle at which the physical layer of the UE performs measurement actually is referred to as a measurement sampling cycle.

Several DRX cycles may be set for UE operating in Dual Connectivity (DC) as described above. In the following description, a DRX-related parameter set by MeNB means a DRX parameter applied to MCG serving cells or set for P-MAC. Also, a DRX-related parameter set by SeNB means a DRX parameter applied to SCG serving cells or set for S-MAC. The P-MAC may be MAC entity to provide a MAC function to the MCG serving cells, and the S-MAC may be MAC entity to provide a MAC function to the SCG serving cells. A "short DRX cycle" and a "long DRX cycle" which will be described later may respectively correspond to a Short DRX cycle and a Long DRX cycle defined in the standard 36.321. According to an embodiment of the present disclosure, MeNB and SeNB may set a DRX independently, and UE may apply the DRX independently for the MCG and SCG. For example, a Physical Downlink Control Channel (PDCCH) may be monitored with respect to serving cells belonging to a MCG for a predetermined time period, and a PDCCH may be monitored with respect to serving cells belonging to a SCG for another predetermined time period. Herein, the PDCCH which is a downlink control channel may transmit scheduling information, etc. The format of the PDCCH may follow the standard 36.211, 212, or 213. That is, a PDCCH monitoring period (corresponding to an "Active Time" in the standard 36.321) may be managed independently for serving cells of a SCG and serving cells of a MCG. That is, the MeNB may set a short DRX cycle and a long DRX cycle, and the SeNB may also set a short DRX cycle and a long DRX cycle. Also, the PDCCH monitoring period may include the short DRX cycle and the long DRX cycle set by the MeNB, and the short DRX cycle and the long DRX cycle set by the SeNB.

Generally, since the MCG and the SCG operate in different frequency bands, different RF circuits (or RF frontends) may be used for MCG serving cells and SCG serving cells. For example, when measurement with respect to a frequency x is to be performed, a RF circuit operating at a frequency that is similar to the frequency x may be used to reduce a time consumed for switching to the measurement frequency and to increase the efficiency of measurement. In the present disclosure, when measurement for a serving cell and a peripheral cell is performed at an arbitrary time, the UE may decide a measurement cycle in consideration of frequencies to be measured, that is, a frequency of a SCG cell, a frequency of a MCG cell, a current DRX cycle of the SCG cell, a current DRX cycle of the MCG cell, etc.

Measurement that is performed by the UE may be largely divided into serving frequency measurement and non-serving frequency measurement. The UE according to an embodiment of the present disclosure may decide a measurement cycle for the serving frequency measurement and a measurement cycle for the non-serving frequency measurement, as follows. The serving frequency measurement means measurement for a carrier frequency or a peripheral cell having the same frequency as the serving cell of the UE. The serving frequency measurement is also called intra-frequency measurement. Also, the non-serving frequency measurement means measurement for a carrier frequency having a center frequency that is different from the center frequency of the serving cell of the UE. The non-serving frequency measurement is also called inter-frequency measurement.

When the UE according to an embodiment of the present disclosure performs intra-frequency measurement, the UE may determine which DRX cycle it applies, in consideration of a cell group of a serving cell formed in a frequency to be measured among serving cells set in the UE. For example, if it is assumed that a PCell is set in f1, the UE may decide a measurement cycle for f1 in consideration of a DRX cycle (or a current DRX cycle applied to a MCG) set for a MCG.

When the UE according to an embodiment of the present disclosure performs inter-frequency measurement, the UE may determine a DRX cycle of which cell group it applies, in consideration of a distance on a frequency domain between a frequency to be measured and a serving frequency of the UE, whether a measurement gap is set, etc.

Figure 5:
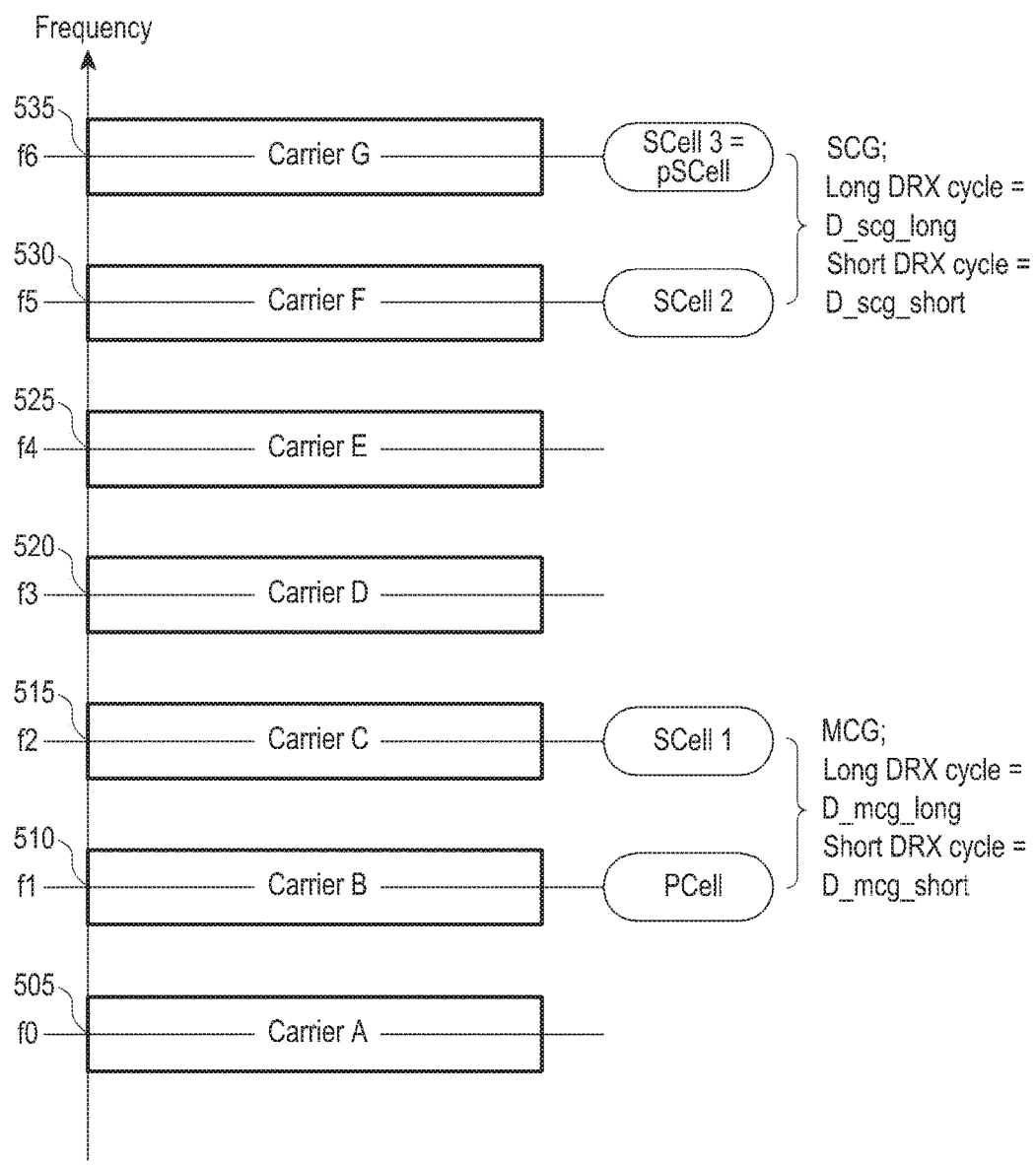
FIG. 5 is a view for describing an example of a method in which User Equipment (UE) decides a measurement cycle for serving frequency measurement, according to an embodiment of the present disclosure.

FIG. 5 is a view for describing an example of a method in which UE decides a measurement cycle for serving frequency measurement, according to an embodiment of the present disclosure.

Referring to FIG. 5, for example, it is assumed that a serving cell for arbitrary UE is set in a carrier B 510, a carrier C 515, a carrier F 530, and a carrier G 535, and the center frequencies of the respective carriers are f1, f2, f5, and f6, respectively. For a MCG of the UE, "D_mcg_long" may be set as a long DRX cycle, and "D_mcg_short" is set as a short DRX cycle. For a SCG of the UE, "D_scg_long" may be set as a long DRX cycle, and "D_scg_short" may be set as a short DRX cycle.

The UE may decide a measurement cycle for an arbitrary serving frequency in consideration of a DRX cycle set for the serving frequency. For example, the UE may decide a measurement cycle for a frequency to be measured by applying a currently used DRX cycle among DRX cycles set for a cell group to which the frequency to be measured belongs. At this time, the UE may consider, in addition to the DRX cycle, other factors, for example, whether the UE operates at an "Active Time" in the corresponding cell group, whether the related SCell is in a deactivated state, etc.

For example, if the center frequency of a carrier to be measured is the same as one of the center frequencies of serving cells set for UE, and no DRX is set for the corresponding serving cell, or the serving cell is in an activated state and at an "Active Time", at least one of RF circuits of the UE may continue to receive a signal from the center frequency of the carrier, and the UE may apply a measurement report cycle of 200 ms. The reason is because a measurement report cycle at which the battery consumption of the UE has an appropriate balance with the measurement accuracy of the UE when no DRX is applied is about 200 ms.

Meanwhile, as another example, it can be assumed that the center frequency of a carrier to be measured is the same as one of the center frequencies of serving cells set for UE, and a DRX is set for the corresponding serving cell, the serving cell is in an activated state but not at an "Active Time", and a long DRX cycle is applied. In this case, the UE may apply, as a measurement report cycle for the carrier, a value obtained by multiplying a predetermined integer (for example, 5) by a long DRX cycle for a cell group to which the corresponding serving cell belongs. The reason is because an RF circuit operating at the center frequency of the carrier among the RF circuits of the UE operates one time for each long DRX cycle to receive a downlink signal.

As another example, it can be assumed that the center frequency of a carrier to be measured is the same as one of the center frequencies of serving cells set for UE, a DRX is set for the corresponding serving cell, the serving cell is in an activated state but not at an "Active Time", and a short DRX cycle is applied. In this case, the UE may apply, as a measurement report cycle for the carrier, a value obtained by multiplying a predetermined integer (for example, 5) by a short DRX cycle for a cell group to which the corresponding serving cell belongs. The reason is because an RF circuit operating at the center frequency of the carrier among the RF circuits of the UE operates one time for each short DRX cycle to receive a downlink signal.

As another example, it can be assumed that the center frequency of a carrier to be measured is the same as the center frequency of a serving cell set for UE, a DRX is set for the corresponding serving cell, and the serving cell is in a deactivated state. In this case, the UE may apply, as a measurement report cycle for the carrier, a greater value between a value obtained by multiplying a predetermined integer by a parameter measCycleSCell set for the carrier and a value obtained by multiplying the predetermined integer by a DRX cycle being currently applied to a cell group to which the corresponding serving cell belongs. Herein, that an arbitrary SCell is in a deactivated state means that no data for the SCell is received or transmitted. Accordingly, if measurement for the SCell in the deactivated state is frequently performed, battery may be consumed unnecessarily. Therefore, the ENB may set a parameter measCycleSCell for each carrier frequency, and the UE may set a measurement report cycle for the SCell in the deactivated state by applying the greater value of the parameter measCycleSCell and a DRX cycle at the corresponding time, thereby preventing the SCell in the deactivated state from being frequently measured unnecessarily. The integer may be a parameter related to the number of times by which the UE acquires a measurement sample for each measurement report cycle. In the present disclosure, the integer is assumed to be 5.

The above-described conditions will be described in regard of the example of FIG. 5, as follows. Referring to FIG. 5, when UE performs measurement for the carrier B 510 for which a PCell is set, that is, when UE measures a PCell and a peripheral cell having the same center frequency as that of the PCell, the UE may decide, for example, a measurement report cycle as seen in Table 1 below. Since the PCell is always in an activated state, a case in which the PCell is in a deactivated state will be not considered. A condition in which a MCG is at an Active Time means that at least one of drx inactivityTimer, onDurationTimer, and drx-retransmissionTimer being driven in connection to the MCG is being driven, or that a condition in which UE is enforced to monitor a PDCCH for serving cells in an activated state of the MCG by a condition defined in Verse 5.7 of the standard 36.321 is satisfied. That a SCG is at an Active Time means that at least one of drx-inactivityTimer, onDurationTimer, and drx-retransmissionTimer being driven in connection to the SCG is being driven, or that a condition in which UE is enforced to monitor a PDCCH for serving cells in an activated state of the SCG by a condition defined in Verse 5.7 of the standard 36.321 is satisfied.

TABLE 1

| Set/Unset MCG DRX | Whether MCG Is at Active Time | Current DRX Cycle of MCG | Measurement Report Cycle | Measurement Sampling Cycle |
|---|---|---|---|---|
| Unset | No Matter | No Matter | 200 ms | 40 ms |
| Set | At Least One of MCG Serving Cells Is at Active Time | No Matter | 200 ms | 40 ms |
| Set | All MCG Serving Cells Are Not at Active Time | Short Cycle | Max [5*D_mcg_short, 200] ms | Max [D_mcg_short, 40] ms |
| Set | All MCG Serving Cells Are Not at Active Time | Long Cycle | Max [5*D_mcg_long, 200] ms | Max [D_mcg_long, 40] ms |

Then, when the UE performs measurement for the carrier C 515 for which a CG SCell is set, that is, when the UE measures a SCell 1 and a peripheral cell having the same center frequency f2 as that of the SCell 1, the UE may decide a measurement report cycle, for example, as seen in Table 2, below.

TABLE 2

| Activated/ Deactivated | Set/Unset MCG DRX | Whether MCG Is at Active Time | Current DRX Cycle of MCG | Measurement Report Cycle | Measurement Sampling Cycle |
|---|---|---|---|---|---|
| Activated | Unset | No Matter | No Matter | 200 ms | 40 ms |

TABLE 2-continued

| Activated/ Deactivated | Set/Unset MCG DRX | Whether MCG Is at Active Time | Current DRX Cycle of MCG | Measurement Report Cycle | Measurement Sampling Cycle |
|---|---|---|---|---|---|
| Activated | Set | At Least One of MCG Serving Cells Is at Active Time | No Matter | 200 ms | 40 ms |
| Activated | Set | All MCG Serving Cells Are Not at Active Time | Short Cycle | Max [5*D_mcg_short, 200] ms | Max [D_mcg_short, 40] ms |
| Activated | Set | All MCG Serving Cells Are Not at Active Time | Long Cycle | Max [5*D_mcg_long, 200] ms | Max [D_mcg_long, 40] ms |
| Deactivated | Unset | No Matter | No Matter | 200 ms | 40 ms |
| Deactivated | Set | At Least One of MCG Serving Cells Is at Active Time | No Matter | 5*measCycle SCell ms | measCycleSCell ms |
| Deactivated | Set | All MCG Serving Cells Are Not at Active Time | Short Cycle | Max [5*D_mcg_short, 5*measCycle SCell] ms | Max [D_mcg_short, 40] ms |
| Deactivated | Set | All MCG Serving Cells Are Not at Active Time | Long Cycle | Max [5*D_mcg_long, 5*measCycle SCell] ms | Max [D_mcg_long, 40] ms |

When the UE performs measurement for the carrier G 535 for which a pSCell is set, that is, when the UE measures a pSCell and a peripheral cell having the same center frequency as that of the pSCell, the UE may decide a measurement report cycle, for example, as seen in Table 3, below. Since the pSCell is always in an activated state, a case in which the pSCell is in a deactivated state will be not considered.

TABLE 3

| Set/Unset SCG DRX | Whether SCG Is at Active Time | Current DRX cycle of SCG | Measurement report cycle | Measurement sampling cycle |
|---|---|---|---|---|
| Unset | No Matter | No Matter | 200 ms | 40 ms |
| Set | At Least One of SCG Serving Cells Is at Active Time | No Matter | 200 ms | 40 ms |
| Set | All SCG Serving Cells Are Not at Active Time | Short Cycle | Max [5*D_scg_short, 200] ms | Max [D_scg_short, 40] ms |
| Set | All SCG Serving Cells Are Not at Active Time | Long Cycle | Max [5*D_scg_long, 200] ms | Max [D_scg_long, 40] ms |

When the UE performs measurement for the carrier F 530 for which a SCG SCell is set, that is, when the UE measures a SCell 2 and a peripheral cell having the same center frequency as that of the SCell 2, the UE may decide a measurement report cycle, for example, as seen in Table 4, below

TABLE 4

| Activated/ Deactivated | Set/Unset SCG DRX | Whether SCG Is at Active Time | Current DRX Cycle of SCG | Measurement Report Cycle | Measurement Sampling Cycle |
|---|---|---|---|---|---|
| Activated | Unset | No Matter | No Matter | 200 ms | 40 ms |

TABLE 4-continued

| Activated/<br>Deactivated | Set/Unset<br>SCG DRX | Whether SCG Is<br>at Active Time | Current<br>DRX<br>Cycle<br>of SCG | Measurement<br>Report Cycle | Measurement<br>Sampling<br>Cycle |
|---|---|---|---|---|---|
| Activated | Set | At Least One of SCG Serving Cells Is at Active Time | No Matter | 200 ms | 40 ms |
| Activated | Set | All SCG Serving Cells Are Not at Active Time | Short Cycle | Max [5*D_scg_short, 200] ms | Max [D_scg_short, 40] ms |
| Activated | Set | All SCG Serving Cells Are Not at Active Time | Long Cycle | Max [5*D_scg_long, 200] ms | Max [D_scg_long, 40] ms |
| Deactivated | Unset | No Matter | No Matter | 5*measCycle SCell ms | measCycleSCell ms |
| Deactivated | Set | At Least One of SCG Serving Cells Is at Active Time | No Matter | 5*measCycle SCell ms | measCycleSCell ms |
| Deactivated | Set | All SCG Serving Cells Are Not at Active Time | Short Cycle | Max [5*D_scg_short, 5*measCycle SCell] ms | Max [D_scg_short, 5*measCycle SCell] ms |
| Deactivated | Set | All SCG Serving Cells Are Not at Active Time | Long Cycle | Max [5*D_scg_long, 5*measCycle SCell] ms | Max [D_scg_long, measCycleSCell] ms |

Figure 6A:
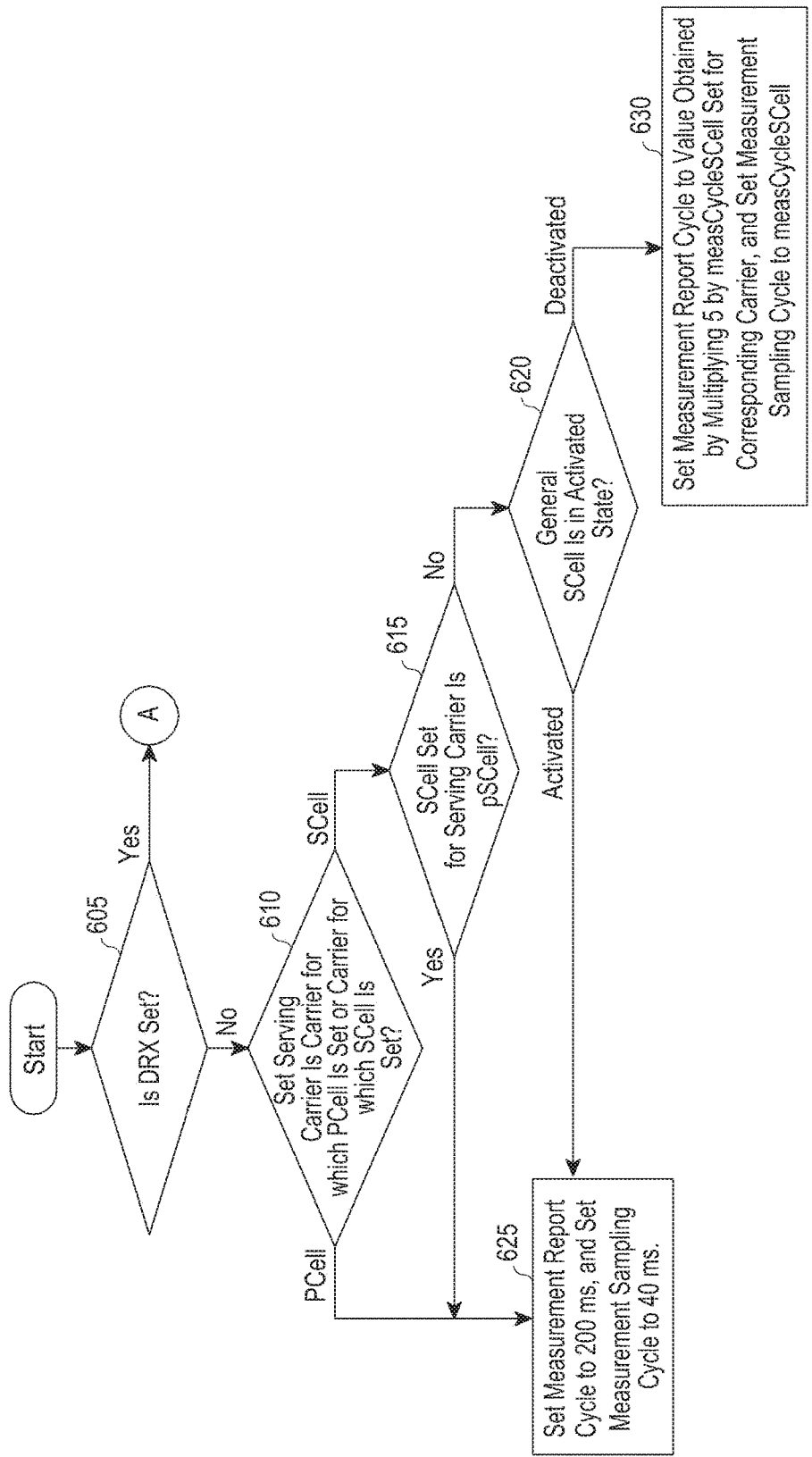
FIGS. 6A and 6B are flowcharts illustrating an example of a method in which UE according to an embodiment of the present disclosure decides a measurement report cycle and a measurement sampling cycle for intra-frequency measurement (or serving frequency measurement) for an arbitrary carrier.
Figure 6B:
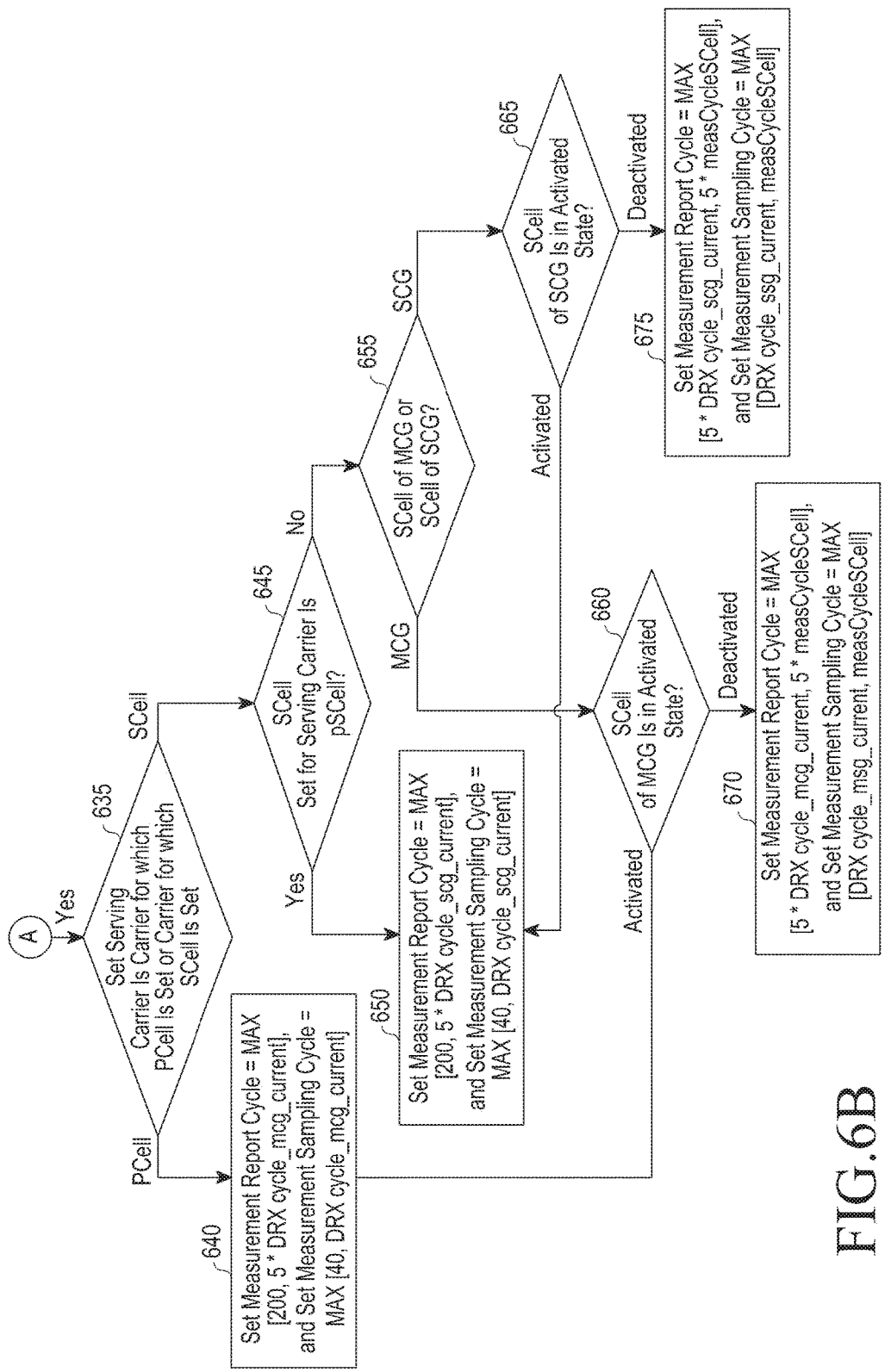

FIGS. 6A and 6B are flowcharts illustrating an example of a method in which the UE according to an embodiment of the present disclosure decides a measurement report cycle and a measurement sampling cycle for intra-frequency measurement (or serving frequency measurement) for an arbitrary carrier. Herein, performing measurement for an arbitrary carrier means periodically measuring the reception signal quality (Reference Signal Received Power or Reference Signal Received Quality) of cells identified from the carrier.

Referring to FIGS. 6A and 6B, if an arbitrary carrier is set as a serving carrier for UE (that is, if a PCell or SCell for an arbitrary carrier is set), the UE may perform intra-frequency measurement for the carrier periodically. For this, the UE may proceed to operation 605 to decide a measurement report cycle and a measurement sampling cycle for the carrier. In operation 605, the UE may determine whether a DRX is set. If the UE determines that a DRX is set, the UE may proceed to operation 635, and if the UE determines that no DRX is set, the UE may proceed to operation 610. In operation 610, the UE may determine whether the set serving carrier is a carrier for which a PCell is set or a carrier for which a SCell is set. If the UE determines that the serving carrier is a carrier for which a PCell is set, the UE may proceed to operation 625, and if the UE determines that the serving carrier is a carrier for which a SCell is set, the UE may proceed to operation 615. In operation 615, the UE may determine whether the SCell set for the serving carrier is a pSCell. If the UE determines that the SCell set for the serving carrier is a pSCell, the UE may proceed to operation 625, and if the UE determines that the SCell is a general SCell, the UE may proceed to operation 620. In operation 620, the UE may determine whether the general SCell is in an activated state or in a deactivated state. If the UE determines that the general SCell is in an activated state, the UE may proceed to operation 625, and if the UE determines that the general SCell is in a deactivated state, the UE may proceed to operation 630. Proceeding to operation 625 means that no DRX is set, and a carrier to be measured is a "carrier for which a PCell is set", a "carrier for which a pSCell is set", or a "carrier for which a SCell in an activated state is set". Accordingly, the UE may set a predetermined cycle, that is, a measurement report cycle to 200 ms, and a measurement sampling cycle to 40 ms.

Proceeding to operation 630 means that no DRX is set, and a carrier to be measured is a "carrier for which a SCell in a deactivated state is set". Accordingly, the UE may set a measurement report cycle to a value obtained by multiplying 5 by measCycleSCell set for the corresponding carrier, and a measurement sampling cycle to the measCycleSCell.

Meanwhile, if the UE determines that a DRX is set, the UE may determine whether the serving carrier is a carrier for which a PCell is set or a carrier for which a SCell is set, in operation 635. If the UE determines that the serving carrier is a carrier for which a PCell is set, the UE may proceed to operation 640, and if the UE determines that the serving carrier is a carrier for which a SCell is set, the UE may proceed to operation 645.

In operation 645, the UE may determine whether the SCell set for the serving carrier is a pSCell. If the UE determines that the SCell is a pSCell, the UE may proceed to operation 650, and if the UE determines that the Scell is a general SCell, the UE may proceed to operation 655.

In operation 655, the UE may determine whether the SCell set for the serving carrier is a SCell of a MCG or a SCell of a SCG If the UE determines that the SCell is a SCell of a MCG, the UE may proceed to operation 660, and if the UE determines that the SCell is a SCell of a SCG, the UE may proceed to operation 665. In operation 660, the UE may determine whether the SCell of the MCG is in an activated state. If the UE determines that the SCell of the MCG is in an activated state, the UE may proceed to operation 640, and if the UE determines that the SCell of the MCG is in a deactivated state, the UE may proceed to operation 670. In operation 665, the UE may determine whether the SCell of the SCG is in an activated state. If the UE determines that the SCell of the SCG is in an activated state, the UE may proceed to operation 650, and if the UE determines that the SCell of the SCG is in a deactivated state, the UE may proceed to operation 675.

Proceeding to operation 640 through the determination of operation 635 means that a DRX for a MCG is set, and a carrier to be measured is a carrier for which a PCell is set or a carrier for which a MCG SCell in an activated state is set. Therefore, the UE may decide a measurement report cycle and a measurement sampling cycle, respectively, according to Equation (1) below.

Measurement report cycle=MAX[200, 5*DRX cycle_mcg_current], and

Measurement sampling cycle=MAX[40, DRX cycle_mcg_current], (1)

where the DRX cycle_mcg_current represents a current DRX cycle that is applied to MCG serving cells.

Proceeding to operation 650 through the determination of operation 645 means that a DRX for a SCG is set, and a carrier to be measured is a carrier for which a pSCell is set or a carrier for which a SCG SCell in an activated state is set. Therefore, the UE may decide a measurement report cycle and a measurement sampling cycle, respectively, according to Equation (2) below.

Measurement report cycle=MAX[200, 5*DRX cycle_scg_current], and Measurement sampling cycle=MAX[40, DRX cycle_scg_current], (2)

where the DRX cycle_scg_current represents a current DRX cycle that is applied to SCG serving cells.

Proceeding to operation 670 through the determination of operation 660 means that a DRX is set, a carrier to be measured is a carrier for which a MCG SCell is set, and the MCG SCell is in a deactivated state. Therefore, the UE may decide a measurement report cycle and a measurement sampling cycle, respectively, according to Equation (3) below.

Measurement report cycle=MAX [5*DRX cycle_mcg_current, 5*measCycleS Cell], and Measurement sampling cycle=MAX[DRX cycle_mcg_current, measCycleSCell], (3)

where the measCycleSCell is set for the corresponding carrier, and can be signaled through a control message for setting the carrier to a measurement object.

The control message may be a RRC connection reconfiguration message, and measCycleScell may be set for each measurement object through information MeasObject-EUTRA of the control message.

Proceeding to operation 675 through the determination of operation 665 means that a DRX is set, a SCG SCell is set for the carrier to be measured, and the SCG SCell is in a deactivated state. Therefore, the UE may decide a measurement report cycle and a measurement sampling cycle, respectively, according to Equation (4) below.

Measurement report cycle=MAX[5*DRX cycle_ scg_current, 5*measCycleSCell], and

Measurement sampling cycle=MAX [DRX cycle_scg_current, measCycleSCell] (4)

Meanwhile, according to an embodiment of the present disclosure, a method of deciding a measurement report cycle and a measurement sampling cycle for non-serving frequency measurement (inter-frequency measurement) may be different from a method of deciding a measurement report cycle and a measurement sampling cycle for serving frequency measurement (intra-frequency measurement). UE that performs non-serving frequency measurement may use an extra RF circuit, or may change the frequency of a currently used RF circuit to a non-serving frequency and then use the RF circuit. Accordingly, it is preferable to decide a measurement report cycle and a measurement sampling cycle in consideration of the state of an RF circuit that is to be used for non-serving frequency measurement.

Generally, the inter-frequency measurement may be performed for a measurement gap. Accordingly, if a measurement gap is set, a measurement sampling cycle may be set to be the same as the measurement gap period. If a DRX is set for UE, the UE may decide a measurement sampling cycle in consideration of a DRX cycle as well as a measurement gap, wherein the measurement gap and the DRX cycle may be set independently for a cell group. In the embodiment of the present disclosure, the UE may determine a DRX and a measurement gap of what CG it will apply, before deciding a measurement report cycle and a measurement sampling cycle. The decided CG is referred to as a reference CG. Since a measurement gap and a DRX parameter are set for each CG, selecting a reference CG means selecting a reference cell. That is, in the embodiment of the present disclosure, selecting a MCG as a reference CG means selecting a PCell as a reference cell, and selecting a SCG as a reference CG means selecting a pSCell as a reference cell. Also, the UE may select a reference CG in consideration of a measurement gap setting condition of each CG For example, the UE may select a reference CG as seen in Table 5. Setting a measurement gap may be interchanged with scheduling a measurement gap.

TABLE 5

| MG for MCG | MG for SCG | Select a Reference CG for Measuring Carrier_Interf which Is a Carrier of an Arbitrary Non-Serving Frequency |
| --- | --- | --- |
| Not Configured | Not Configured | UE Requiring a Measurement Gap for Measuring Carrier-Interf Set a Measurement Report Cycle (and a Measurement Sampling Cycle) for Carrier-Interf to "Infinite" without Selecting a Reference CG (That is, no measurement for Carrier_Interf Is Performed) UE Capable of Measuring Carrier_Interf without a Measurement Gap Select a Reference CG according to a Predetermined Rule |

TABLE 5-continued

| MG for MCG | MG for SCG | Select a Reference CG for Measuring Carrier_Interf which Is a Carrier of an Arbitrary Non-Serving Frequency |
|---|---|---|
| Configured | Not Configured | Select PCell/MCG as a Reference CG for Measuring Carrier_Interf |
| Not Configured | Configured | Select pSCell/SCG as a Reference CG for Measuring Carrier_Interf |
| Configured | Configured | Select a Reference CG according to a Predetermined Rule |

If the UE according to an embodiment of the present disclosure selects a reference CG for an arbitrary non-serving frequency, the UE may decide a measurement sampling cycle and a measurement report cycle for the non-serving frequency in consideration of a DRX setting and a measurement gap setting of the reference CG.

If no measurement gap for both a MCG and a SCG is set, the UE may determine whether it can measure a non-serving frequency without any measurement gap. If there is an extra RF circuit except for RF circuits operating for the MCG and SCG, the UE can measure a non-serving frequency without any measurement gap, and accordingly, the UE may select a reference cell or a reference CG according to a predetermined rule. The predetermined rule may vary depending on which one of the accuracy of measurement and battery consumption of the UE is prioritized. If the accuracy of measurement is prioritized rather than battery consumption, the UE may select a reference CG such that a measurement report cycle and a measurement sampling cycle are shortened (hereinafter, referred to as "Approach 1"). In contrast, if battery consumption is prioritized rather than the accuracy of measurement, the UE may select a reference CG such that a measurement report cycle and a measurement sampling cycle are lengthened (hereinafter, referred to as "Approach 2"). For example, if the Approach 1 is applied, the UE may check a current DRX cycle of the MCG and SCG to select a CG having a short DRX cycle as a reference CG, and apply the DRX cycle of the selected CG to decide a measurement report cycle and a measurement sampling cycle. Also, if the Approach 2 is applied, the UE may check a current DRX cycle of the MCG and SCG to select a CG having a long DRX cycle as a reference CG, and apply the DRX cycle of the selected CG to decide a measurement report cycle and a measurement sampling cycle. Also, the UE may select a reference CG or a reference cell such that measurement is most frequently performed or such that measurement is most infrequently performed, in consideration of all measurement requirements as well as the DRX cycle, in the Approach 1 and the Approach 2. According to another embodiment, the UE may select a cell to which a longest measurement cycle is applied, as a reference cell. Considering all measurement requirements means considering all of a DRX cycle, an activated/deactivated state, measCycleSCell, etc. For example, it is assumed that the Approach 2 is used to select a measurement report cycle for another frequency except for frequencies f1 to f4 as seen in Table 6 below. In this case, the UE may select a SCell 1 having a longest measurement report cycle as a reference cell. If the Approach 2 is used, the UE may select a pSCell having a shortest measurement report cycle as a reference cell.

TABLE 6

| | Current DRX cycle | Activated/Deactivated | measCycleSCell | Measurement Report Cycle |
|---|---|---|---|---|
| PCell (f1) | 320 ms | | 640 ms | 1600 ms |
| SCell 1(f2); MCG | 320 ms | Deactivated | 640 ms | 3200 ms |
| pSCell (f3) | 80 ms | | 320 ms | 400 ms |
| SCell 2 (f4); SCG | 80 ms | Activated | 640 ms | 400 ms |

If no measurement gap for both the MCG and SCG is set, and no non-serving frequency can be measured without any measurement gap, the UE according to an embodiment of the present disclosure may perform no measurement for the corresponding non-serving frequency. If a measurement gap is set for one CG of the MCG and SCG, the UE according to an embodiment of the present disclosure may select the CG for which the measurement gap is set, as a reference CG, and apply a DRX cycle, etc. of the selected reference CG to decide a measurement report cycle and a measurement sampling cycle.

Also, if measurement gaps for the MCG and SCG are set, the UE may select a reference cell or a reference CG according to a predetermined rule. In this case, like when no measurement gap for the MCG and SCG is set, the UE may use the Approach 1 or the Approach 2 to select a reference cell or a reference CG. Alternatively, the ENB may instruct the UE to use a measurement gap of what cell or what CG through RRC signaling. For example, the ENB may include information about what measurement object the corresponding measurement gap should be used to measure, explicitly, in a measurement gap setting control message for the SCG. For example, if a measurement object mapped to a SCG measurement gap is a serving frequency (that is, intra-frequency measurement), the above-described method of deciding a measurement report cycle and a measurement sampling cycle for a serving frequency may be applied. If the measurement object is a non-serving frequency (that is, inter-frequency measurement), the UE may select the SCG as a reference cell or a reference CG in measuring the measurement object.

Also, the UE according to an embodiment of the present disclosure may select the MCG as a reference CG with respect to a measurement object unrelated to the measurement gap of the SCG, among measurement objects to which inter-frequency measurement should be applied, and perform measurement using the measurement gap of the MCG.

Figure 7:
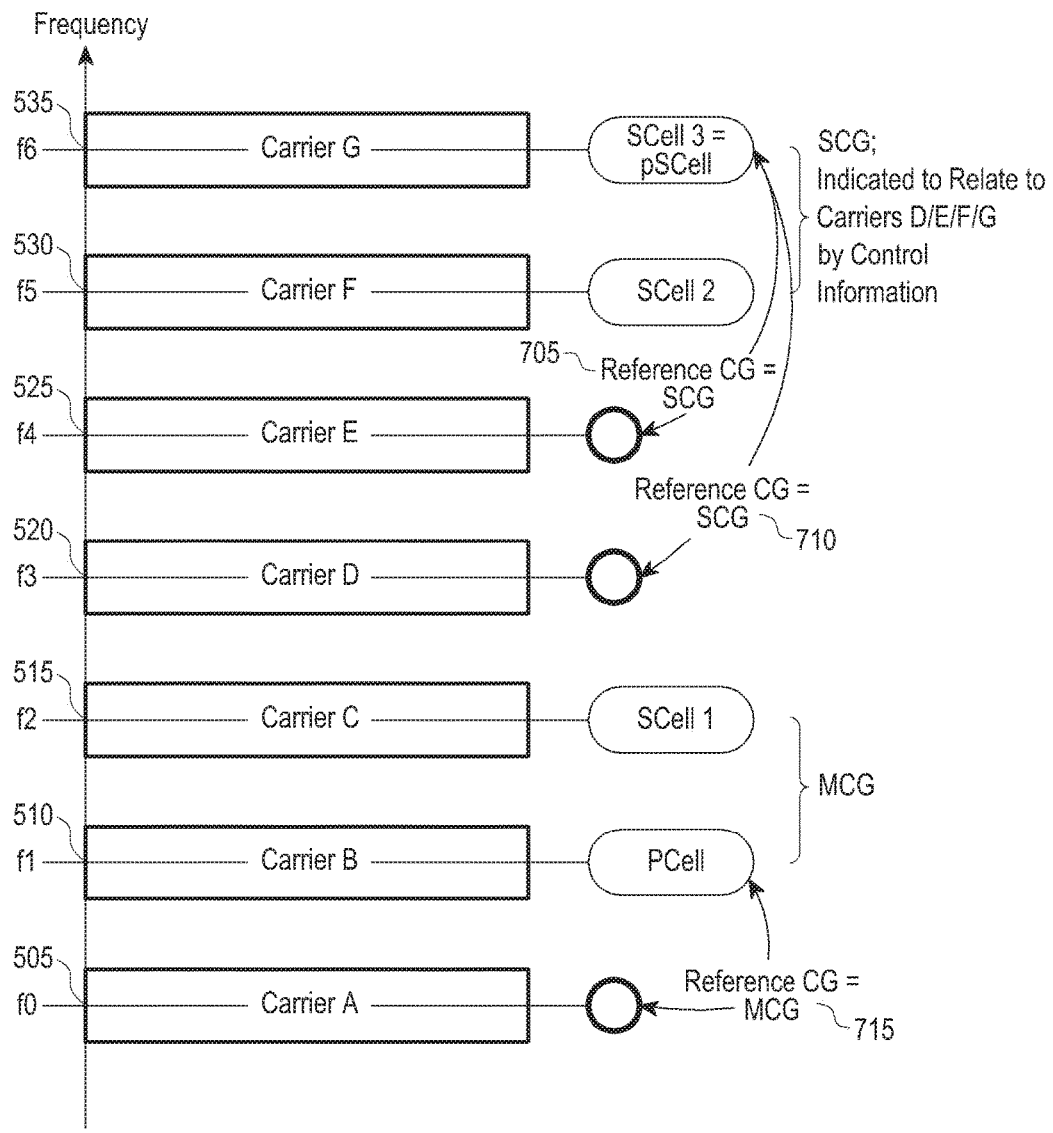
FIG. 7 is a view for describing an example of operation in which UE according to an embodiment of the present disclosure decides a CG for inter-frequency measurement.

FIG. 7 is a view for describing an example of operation in which the UE according to an embodiment of the present disclosure decides a CG for inter-frequency measurement.

Referring to FIG. 7, it is assumed that measurement gaps for a MCG and a SCG are set, and carriers D, E, F, and G are set as measurement objects related to the measurement gap of the SCG explicitly through a RRC control message. In this case, the UE according to an embodiment of the present disclosure may determine implicitly that the remaining measurement objects, that is, carriers A, B, and C are related to the measurement gap of the MCG. That an arbitrary carrier is a measurement object means that the center frequency of the carrier is a measurement object. Also, the UE may decide a measurement report cycle and a measurement sampling cycle with respect to a measurement object corresponding to a serving frequency among the measurement objects, using the method described above with reference to FIGS. 5 and 6, and apply the mapping information to decide a reference CG with respect to the carriers A, D, and E which are measurement objects corresponding to non-serving frequencies. Since the carrier A is related to the measurement gap of the MCG, the UE may select the MCG as a reference CG for the carrier A (715). Since the carriers D and E are related to the measurement gap of the SCG, the UE may select the SCG as a reference CG (705, 710).

Also, the UE according to an embodiment of the present disclosure may select a reference CG regardless of measurement gap settings. More specifically, there are three methods of selecting a reference CG, as follows.

[Method 1 of Selecting a Reference CG for a Non-Serving Frequency x]

In this case, a cell having a shortest distance on frequency domain to the non-serving frequency x may be selected as a reference cell. For example, referring to FIG. 5, if a distance between the center frequency f4 of the carrier E 525 and the center frequency f6 of the pSCell is shorter than a distance on frequency domain between the center frequency f4 and the center frequency f1 of the PCell, the UE may select the PSCell as a reference cell of the carrier E.

[Method 2 of Selecting a Reference CG for a Non-Serving Frequency x]

In this case, a cell group having a shortest distance on frequency domain to the non-serving frequency x may be decided as a reference CG For example, referring to FIG. 5, if a distance on frequency domain between the center frequency f3 of the carrier D 520 and the MCG (or, a carrier or a serving cell closet to the corresponding frequency among serving cells belonging to the MCG) is shorter than a distance on frequency domain between the center frequency f3 and the SCG, the UE may select the MCG as a reference CG of the carrier D.

[Method 3 of Selecting a Reference CG for a Non-Serving Frequency x]

In this case, the UE may select a predetermined CG as a reference CG For example, the UE may select the MCG as a reference CG.

Meanwhile, according to an embodiment of the present disclosure, a measurement gap may be set independently for a MCG and a SCG. That is, it is assumed that a first measurement gap is set for MCG serving cells, and a second measurement gap is set for SCG serving cells. In this case, the UE may stop transmission and reception to/from the MCG serving cells for the first measurement gap, and stop transmission/reception to/from the SCG serving cells for the second measurement gap. According to another embodiment, the UE may use one of the first and second measurement gaps for a predetermined time to apply the measurement gap to the MCG or the SCG As such, if a measurement gap is set for a CG, the UE may release the set measurement gap according to a predetermined rule. If the UE receives a RRC connection reconfiguration message for creating a SCG or setting a new SCG SCell when a measurement gap for a MCG has been set, the UE may determine whether measurement gap setting information is included in the RRC connection reconfiguration message. If the UE determines that the measurement gap setting information is included in the RRC connection reconfiguration message, the UE may release the measurement gap of the MCG, and set a new measurement gap for the SCG in correspondence to the measurement gap setting information. Also, if the UE receives a control message instructing a measurement gap setting for a SCG when a measurement gap for a MCG has been set, the UE may release the MCG measurement gap, and set a SCG measurement gap. Meanwhile, if the UE receives a control message for setting a measurement gap for a MCG when a measurement gap for a SCG has been set, the UE may release the SCG measurement gap, and set a new measurement gap for the MCG.

Figure 8:
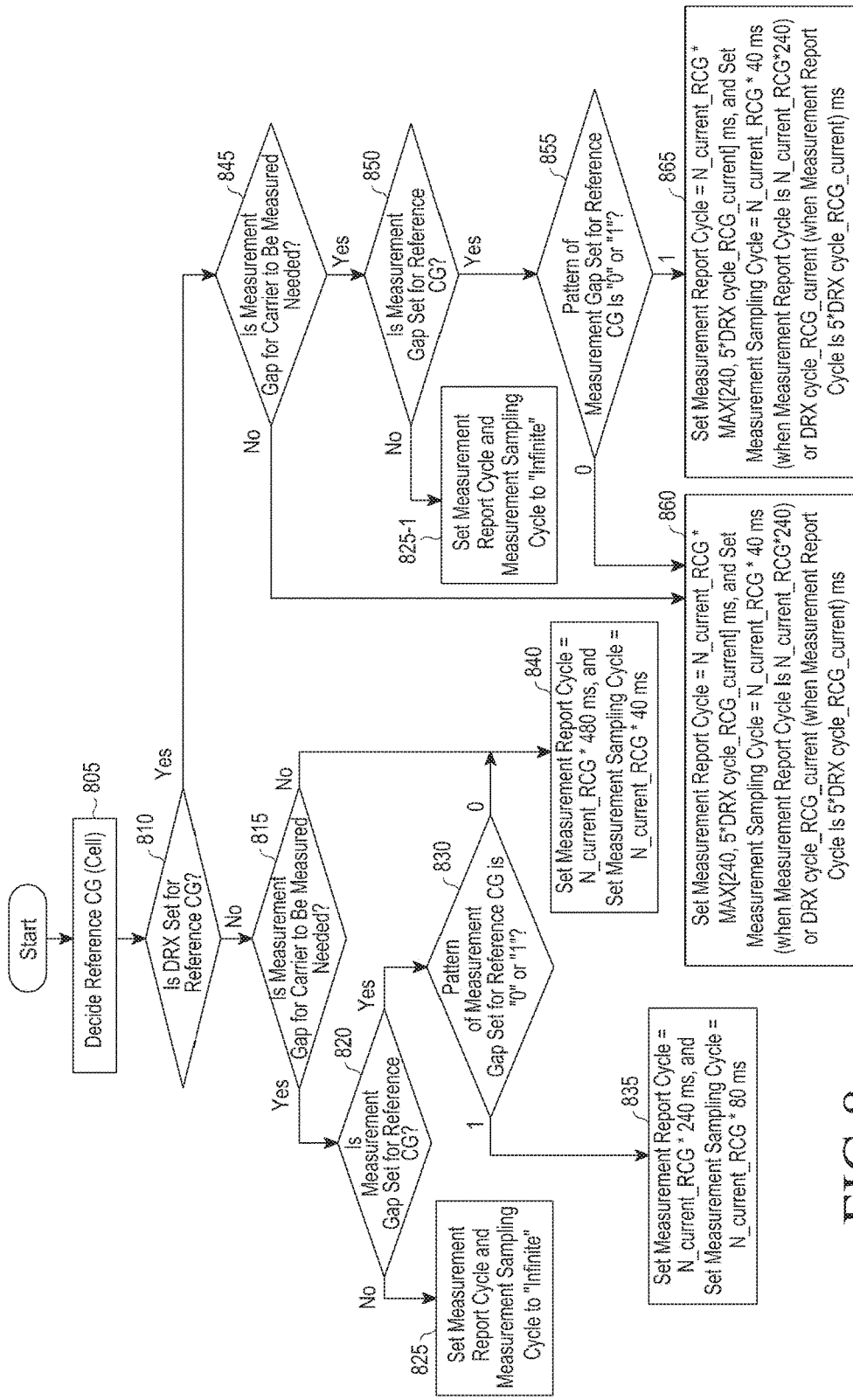
FIG. 8 is a flowchart illustrating an example of a method in which UE according to an embodiment of the present disclosure decides a measurement report cycle and a measurement sampling cycle for inter-frequency measurement (or non-serving frequency measurement) for an arbitrary carrier.

FIG. 8 is a flowchart illustrating an example of a method in which the UE according to an embodiment of the present disclosure decides a measurement report cycle and a measurement sampling cycle for inter-frequency measurement (or non-serving frequency measurement) for an arbitrary carrier.

Referring to FIG. 8, for example, if ENB of a MCG instructs UE to measure an arbitrary carrier, and the carrier to be measured is a non-serving carrier (that is, if the center frequencies of current serving cells are different from the center frequency of the carrier, or if the center frequencies of serving cells set for the UE are different from the center frequency of the carrier to be measured), the UE may perform inter-frequency measurement for the carrier. In this case, the UE may proceed to operation 805 to decide a measurement report cycle and a measurement sampling cycle. In operation 805, the UE may decide a reference CG (cell).

In operation 810, the UE may determine whether a DRX is set in the decided reference CG. If the UE determines that no DRX is set in the decided reference CG, the UE may proceed to operation 815, and if the UE determines that a DRX is set in the decided reference CG, the UE may proceed to operation 845.

In operation 815, the UE may determine whether a measurement gap is needed in order to measure the carrier to be measured. If the UE determines that a measurement gap is needed, the UE may proceed to operation 820, and if the UE determines that no measurement gap is needed, the UE may proceed to operation 840. In operation 820, the UE may determine whether a measurement gap is set in the reference CG. If the UE determines that no measurement gap is set in the reference CG, the UE may proceed to operation 825, and if the UE determines that a measurement gap is set in the reference CG, the UE may proceed to operation 830.

In operation 830, the UE may determine whether a pattern of the measurement gap set for the reference CG is "0" or "1". If the UE determines that the pattern of the measurement gap is "0", the UE may proceed to operation 840, and if the UE determines that the pattern of the measurement gap is "1", the UE may proceed to operation 835. The pattern "0"

of the measurement gap is a pattern in which a measurement gap is scheduled (or generated) one time every 40 ms. Also, the pattern "1" of the measurement gap is a pattern in which a measurement gap is scheduled one time every 80 ms. The pattern "1" of the measurement gap may be set when a wide bandwidth can be measured with respect to an object for inter-frequency measurement. Typically, the UE may measure 6 Physical Resource Blocks (PRBs) from the center frequency of an object to be measured, however, if a measurement gap pattern is set to "1", the UE may measure 50 RPBs from the center frequency of an object to be measured. The measurement gap pattern may follow the standard 36.133.

Proceeding to operation 825 means that the UE requires a measurement gap in order to perform inter-frequency measurement for the carrier to be measured, but no measurement gap is set for the reference CG. Also, in operation 825, the UE may set both a measurement report cycle and a measurement sampling cycle for the carrier to be measured to "infinite" so as to perform no measurement for the carrier.

Proceeding to operation 835 means that the UE requires a measurement gap in order to perform inter-frequency measurement for the corresponding carrier, a measurement gap is set for the reference CG, and a measurement gap pattern is set to "1". In operation 835, the UE may set a measurement report cycle and a measurement sampling cycle according to Equation (5), below.

$$\text{Measurement report cycle} = N\_current\_RCG*240 \text{ ms}, \text{ and Measurement sampling cycle} = N\_current\_RCG*80 \text{ ms}, \quad (5)$$

where the N_current_RCG represents the number of non-serving carriers (or inter-frequencies) that are measured by an RF circuit servicing the reference CG, or the number of non-serving carriers that are measured through the measurement gap of the corresponding CG, and the N_current_RCG is defined as the same meaning as Nfreq of the standard 36.133.

Proceeding to operation 840 means that the UE requires a measurement gap in order to perform inter-frequency measurement according to the measurement instruction, a measurement gap is set for the reference CG, and a measurement gap pattern is set to "0". Or, proceeding to operation 840 means that the UE can perform inter-frequency measurement for the corresponding carrier although there is no measurement gap. In this case, the UE may set a measurement report cycle and a measurement sampling cycle according to Equation (6), below.

$$\text{Measurement report cycle} = N\_current\_RCG*480 \text{ ms}, \text{ and Measurement sampling cycle} = N\_current\_RCG*40 \text{ ms}, \quad (6)$$

In operation 845, the UE may determine whether a measurement gap is needed in order to measure the carrier to be measured. If the UE determines that a measurement gap is needed, the UE may proceed to operation 850, and if the UE determines that no measurement gap is needed, the UE may proceed to operation 860.

In operation 850, the UE may determine whether a measurement gap is set for the reference CG If the UE determines that no measurement gap is set for the reference CG, the UE may proceed to operation 825, and if the UE determines that a measurement gap is set for the reference CG, the UE may proceed to operation 855. In operation 855, the UE may determine whether a pattern of the measurement gap set for the reference CG is "0" or "1". If the UE determines that the pattern of the measurement gap is "0", the UE may proceed to operation 860, and if the UE determines that the pattern of the measurement gap is "1", the UE may proceed to operation 865.

Proceeding to operation 865 means that a measurement gap is needed in order for the UE to perform inter-frequency measurement for the carrier to be measured, a measurement gap and a DRX are set for the reference CG, and the pattern of the measurement gap is set to "1". In this case, the UE may set a measurement report cycle and a measurement sampling cycle according to Equation (7), below.

$$\text{Measurement report cycle} = N\_current\_RCG*MAX[480, 5*DRX \text{ cycle}\_RCG\_current] \text{ ms, and Measurement sampling cycle} = N\_current\_RCG*80 \text{ ms (when the measurement report cycle is } N\_current\_RCG*480) \text{ or DRX cycle}\_RCG\_current \text{ (when the measurement report cycle is } 5*DRX \text{ cycle}\_RCG\_current) \text{ ms}, \quad (7)$$

where the DRX cycle_RCG_current represents a current DRX cycle of the corresponding reference CG.

Proceeding to operation 860 means that a measurement gap is needed in order for the UE to perform inter-frequency measurement for the carrier to be measured, a measurement gap is set in the reference CG, and the pattern of the measurement gap is "0". Or, proceeding to operation 860 means that the UE can perform inter-frequency measurement for the carrier to be measured although there is no measurement gap. In this case, the UE may set a measurement report cycle and a measurement sampling cycle according to Equation 8, below.

$$\text{Measurement report cycle} = N\_current\_RCG*MAX[240, 5*DRX \text{ cycle}\_RCG\_current] \text{ ms, and Measurement sampling cycle} = N\_current\_RCG*40 \text{ ms (when the measurement report cycle is } N\_current\_RCG*240) \text{ or DRX cycle}\_RCG\_current \text{ (when the measurement report cycle is } 5*DRX \text{ cycle}\_RCG\_current) \text{ ms}. \quad (8)$$

After the UE decides a measurement report cycle and a measurement sampling cycle for the arbitrary carrier to be measured, the UE may perform measurement for the carrier in correspondence to the decided measurement sampling cycle. At this time, the UE may adjust a "measurement sampling time" at which measurement starts and a "measurement report time" at which the result of the measurement is reported such that the "measurement sampling time" does not overlap the "measurement report time". In this case, the UE may space an arbitrary n-th measurement report time by a predetermined period from a 5*n-th measurement sampling time so that the latest result of measurement can be transferred to the RRC layer device.

Figure 9:
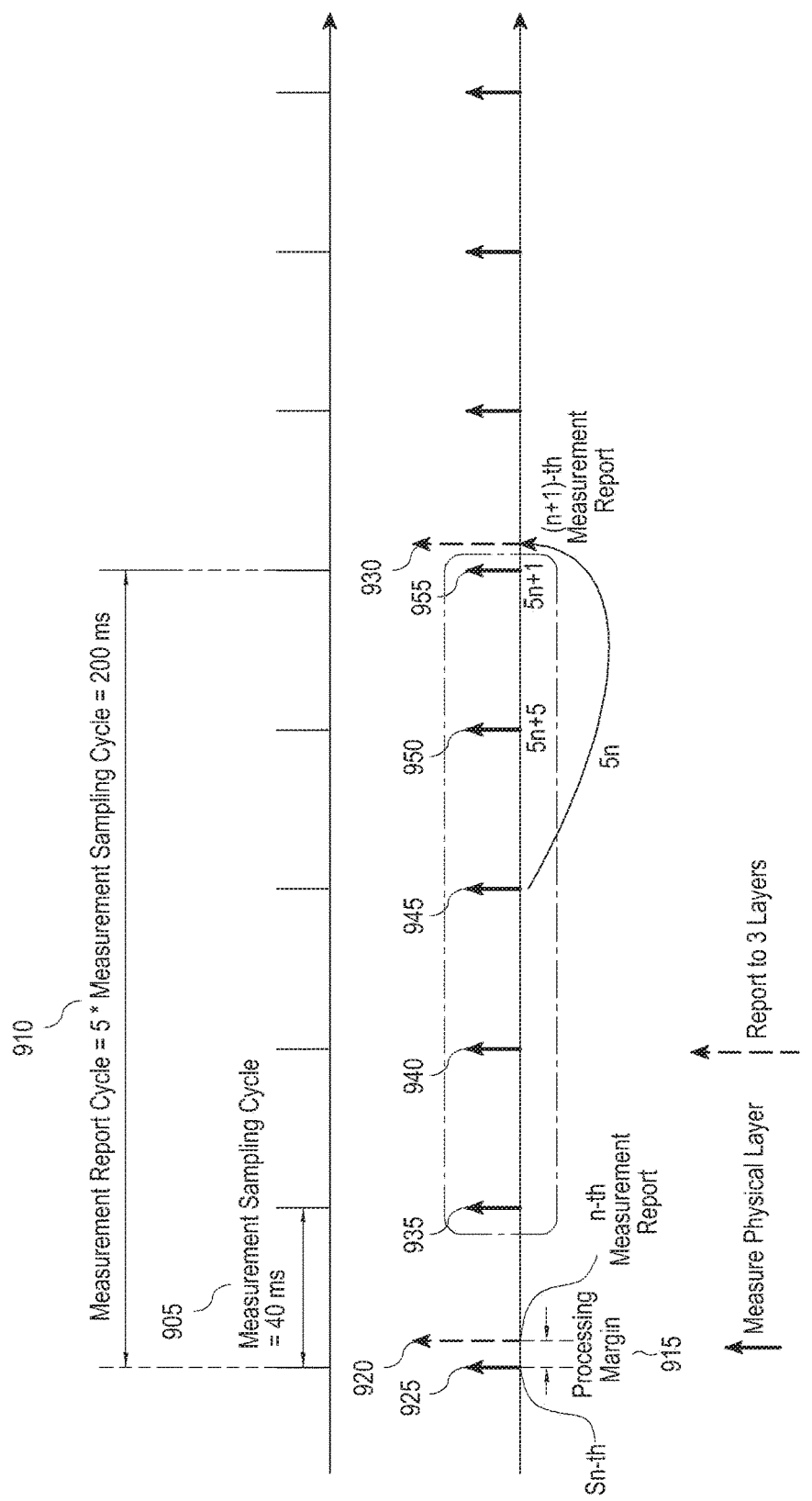
FIG. 9 is a view for describing an example of operation in which UE according to an embodiment of the present disclosure performs a scheduling request.

FIG. 9 is a view for describing an example of operation in which UE according to an embodiment of the present disclosure performs a scheduling request.

Referring to FIG. 9, it is assumed that a measurement sampling cycle 905 is 40 ms, and a measurement report cycle 910 is 200 ms (=40 (measurement sampling cycle 905)*5). In this case, UE may space a n-th measurement report time 920 by a processing margin 915 from a 5n-th measurement sampling time 925. The processing margin 915 may depend on the processing margin of the UE, and may be set to a value that is smaller than at least the measurement sampling cycle 905. Also, at a (n+1)-th measurement report time 930, the physical layer of the UE may report a value (for example, an average value, an intermediate value, or an intermediate value except for a maximum value and a minimum value, hereinafter, referred to as a "measurement representative value") related to results measured after the n-th measurement report time, to the RRC layer. That is, the UE may report a measurement representative value processed from result values measured from a (5n+1)-th measurement sampling time 935 to a (5n+5)-th measurement sampling time 950, to the RRC layer.

A measurement report cycle and a measurement sampling cycle according to an embodiment of the present disclosure may be decided and changed by various factors, such as a current DRX cycle, an activated/deactivated state, the number of objects to be measured, etc. For example, the DRX cycle of the UE may change from a "short cycle" to a "long cycle" or from the "long cycle" to the "short cycle", according to a scheduling situation. Also, the activated/deactivated state may also change from a "deactivated state" to an "activated state" or from the "activated state" to the "deactivated state", according to an explicit instruction from ENB. When the measurement sampling cycle and the measurement report cycle change due to the change of any factor, the UE according to an embodiment of the present disclosure may apply a "temporary measurement report cycle" while the measurement sampling cycle and the measurement sampling cycle change, if a time at which the change occurs is not aligned to a measurement report time.

Figure 10:
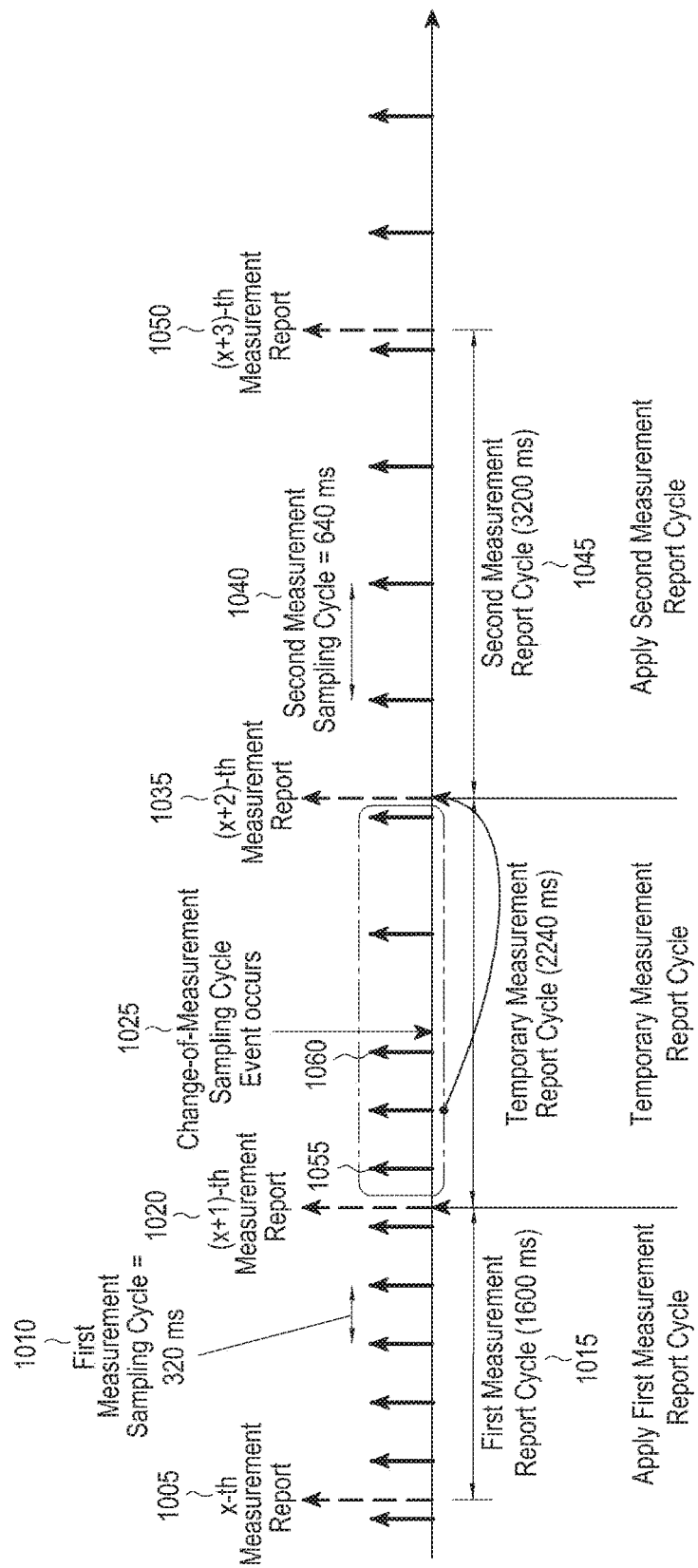
FIG. 10 is a view for describing an example of a case in which UE applies a temporary measurement report cycle when a measurement sampling cycle and a measurement report cycle change, according to an embodiment of the present disclosure.

FIG. 10 is a view for describing an example of a case in which the UE applies a temporary measurement report cycle when a measurement sampling cycle and a measurement report cycle change, according to an embodiment of the present disclosure.

Referring to FIG. 10, for example, it is assumed that a measurement sampling cycle changes from a first measurement report sampling cycle 1010 "320 ms" to a second measurement report sampling cycle 1040 "640 ms" at an arbitrary time 1025, due to, for example, a change in DRX cycle, a change in activated/deactivated state, a change in Nfreq, etc. In this case, the UE may apply a first measurement report cycle, that is, 1600 ms upto a (x+1)-th measurement report time 1020 which is a previous measurement report time closest to the time 1025 at which the measurement sampling cycle changes. Also, the UE according to an embodiment of the present disclosure may apply a temporary measurement report cycle to decide a (x+2)-th measurement report time 1035 which is the next measurement report time. The temporary measurement report cycle may be a cycle of applying a first measurement sampling cycle to y measurement samplings from a first measurement sampling time 1055 after the final measurement report time 1025 to a sampling time 1060 just before the time 1025 at which the measurement sampling cycle changes, and applying a second sampling cycle to (5-y) measurement samplings after the time 1025 at which the measurement sampling cycle changes. In the example of FIG. 10, since three first measurement sampling cycles and two second measurement sampling cycles decide a temporary measurement report cycle, the temporary measurement report cycle may be 320*3+640*2=2240 ms. Also, after the UE uses the temporary measurement report cycle, the UE may begin to apply the second measurement report cycle.

In summary, when a change from a first measurement sampling cycle to a second measurement sampling cycle occurs at an arbitrary time, the UE may apply a first measurement report cycle upto a measurement report time just before the change occurs, decide a temporary measurement report cycle including five measurement sampling times, then apply the temporary measurement report cycle one time, and begin to apply a second measurement report cycle. Accordingly, during a period for which the temporary measurement report cycle is applied, the first sampling cycle and the second sampling cycle may coexist.

Figure 11:
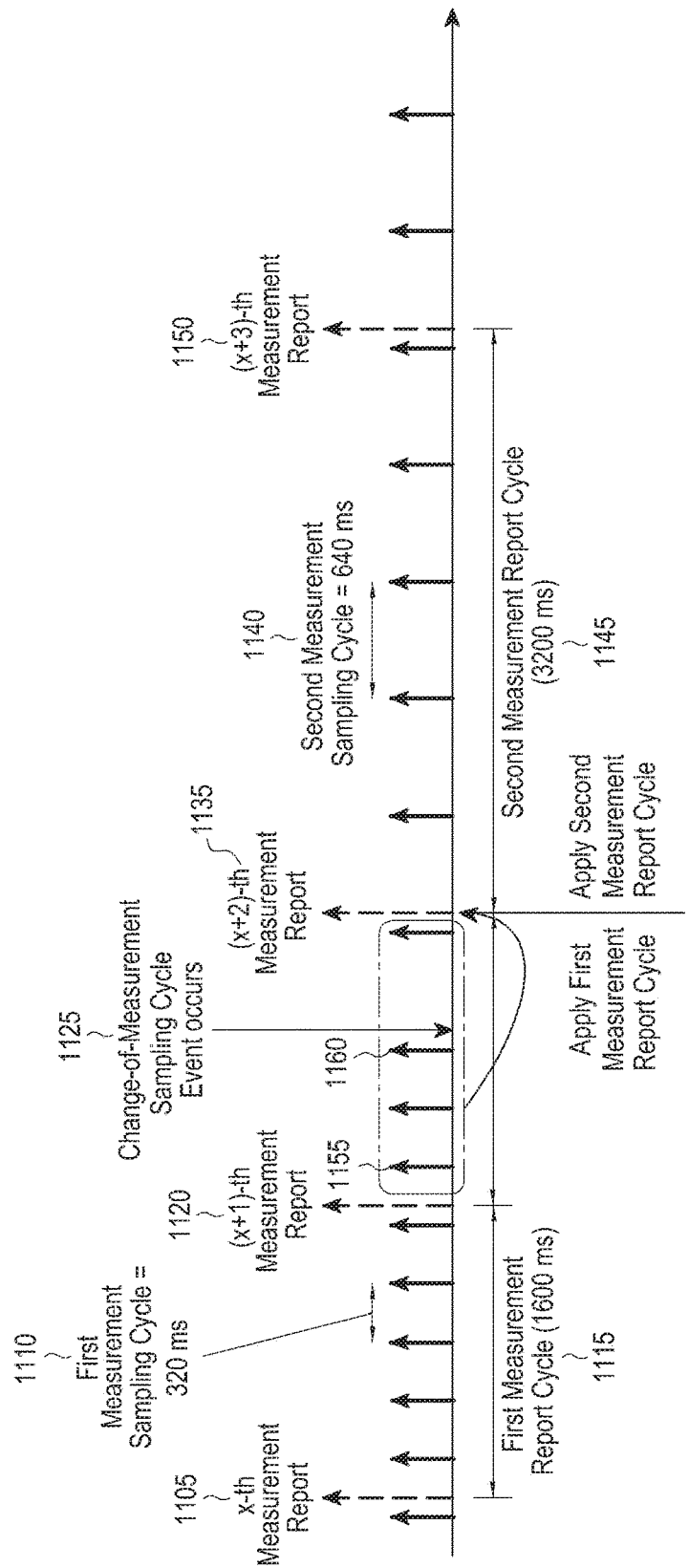
FIG. 11 is a view for describing another example of operation in which UE decides a measurement report cycle when the measurement sampling cycle changes, according to an embodiment of the present disclosure.

FIG. 11 is a view for describing another example of operation in which the UE decides a measurement report cycle when the measurement sampling cycle changes, according to an embodiment of the present disclosure.

Referring to FIG. 11, the UE may decide, instead of using a temporary measurement report cycle, the next measurement report time 1135 after a previous measurement report time 1120 closet to a time 1125 at which a measurement sampling cycle changes, by applying a value resulting from multiplying 5 by the shorter one of a first measurement sampling cycle and a second measurement sampling cycle (that is, by applying the shorter one of a first measurement report cycle and a second measurement report cycle). In the example of FIG. 11, since the first measurement sampling cycle (=320 ms) is shorter than the second measurement sampling cycle (=640 ms), the first measurement report time 1135 after the time 1125 at which the measurement sampling cycle changes may be decided by applying the first measurement report cycle. Thereafter, the UE may apply the changed measurement sampling cycle and the changed measurement report cycle. If the first measurement sampling cycle is longer than the second measurement sampling cycle, the first measurement report time 1135 after a measurement sampling cycle change event occurs may be decided by applying the second measurement report cycle.

In summary, if a change from a first measurement sampling cycle to a second measurement sampling cycle occurs at an arbitrary time, a first measurement report cycle may be applied upto a measurement report time 1120 just before the time at which the change occurs, then, the next measurement report time may be decided one time by applying the shorter one of the first measurement report cycle and a second measurement report cycle, and thereafter the second measurement report cycle may be applied.

After the UE decides the measurement report cycle and the measurement sampling cycle according to the process described above with reference to FIGS. 5 to 11, the UE may decide a measurement report time and a measurement sampling time by applying the measurement report cycle and the measurement sampling cycle. At this time, the measurement report time may be decided to be spaced by a processing delay from the measurement sampling time.

Also, the measurement sampling time may be, when a DRX is being driven, decided, as follows. In the case of intra-frequency measurement, the measurement sampling time may be selected to belong to an onDuration period of the DRX. The reason is to perform measurement when the receiver of the UE is turned on for the onDuration period since intra-frequency measurement can be performed while receiving a signal of a current serving cell.

In the case of inter-frequency measurement allowing measurement without any measurement gap, the measurement sampling time may be decided to belong to the onDuration period of the DRX. The reason is because the inter-frequency measurement allowing measurement without any measurement gap is performed using a separate RF which is different from an RF used to receive a signal of a current serving cell. Therefore, maximally overlapping a driving period of the RF used to receive the signal of the serving cell with the driving period of the separate RF is advantageous in view of power consumption.

Also, in the case of inter-frequency measurement disallowing measurement without any measurement gap, the measurement sampling time may be selected to belong to a predetermined period just before the onDuration period of the DRX. The reason is because the measurement sampling cycle should not overlap the onDuration period since the inter-frequency measurement requiring a measurement gap is performed using an RF used to receive a signal of a current serving cell.

Figure 12:
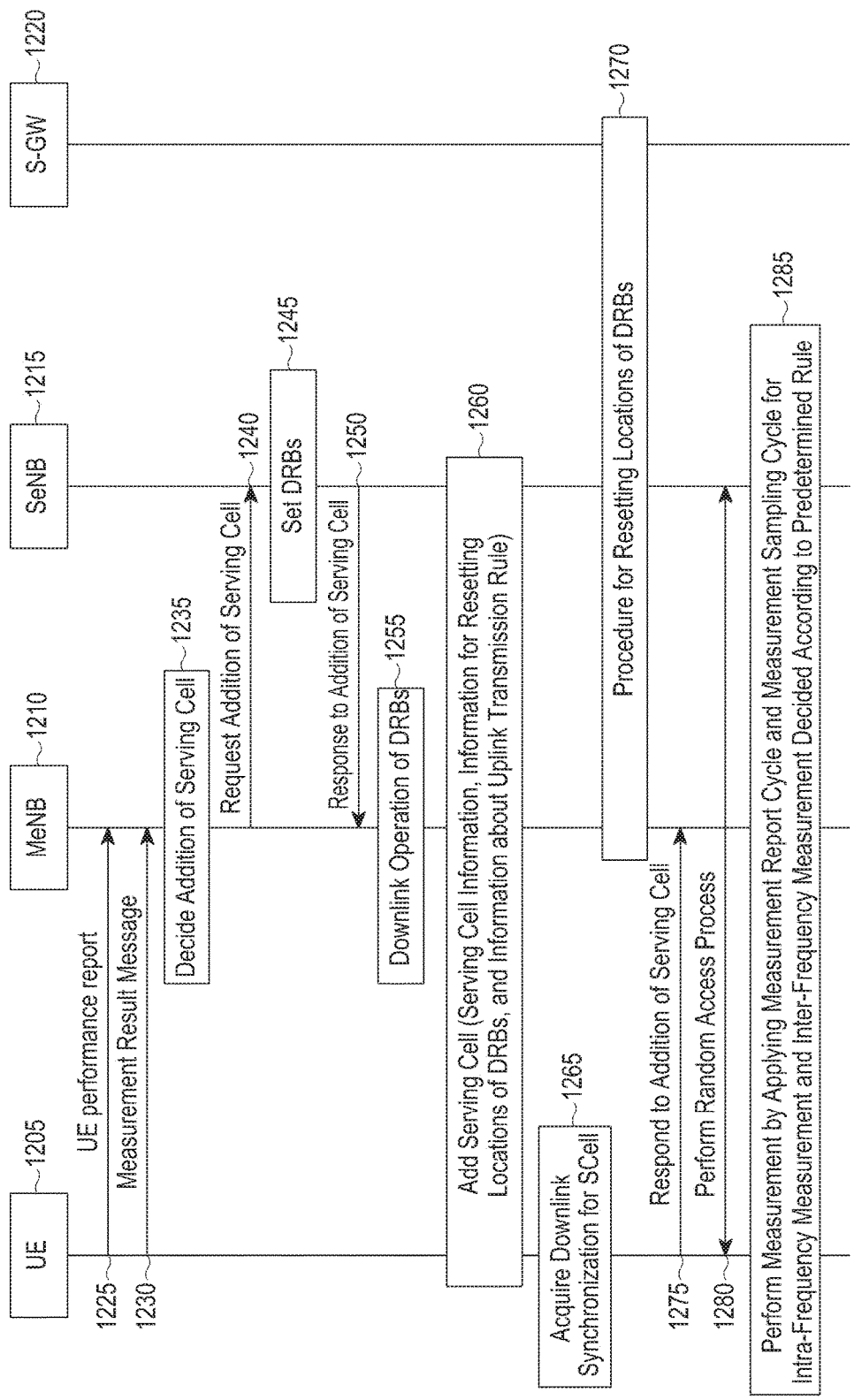
FIG. 12 is a flowchart illustrating an example of signal processing operation for transmitting a signal using multiple carriers in UE according to an embodiment of the present disclosure.

FIG. 12 is a flowchart illustrating an example of signal processing operation for transmitting a signal using multiple carriers in the UE according to an embodiment of the present disclosure.

Referring to FIG. 12, in operation 1225, if a predetermined condition required by a LTE network is satisfied, UE 1205 may transfer its own performance report to MeNB 1210. Herein, the predetermined condition may be, for example, a case in which the UE 1205 receives a performance report request from ENB. A performance report message used to transfer the performance report of the UE 1205 to the MeNB 1210 may include a "list of frequency bands supported by the UE 1205", a "list of combinations of the frequency bands supported by the UE 1205", "MIMO performance for each combination of the frequency bands", and "information indicating whether a measurement gap is needed for each combination of the frequency bands", etc. The "information indicating whether a measurement gap is needed for each combination of the frequency bands" may indicate, with "1 bit" for each frequency band, whether a measurement gap is needed upon measurement on another frequency band, when the UE 1205 is set according to the corresponding combination of the frequency bands supported by the UE 1205. Accordingly, the "information indicating whether a measurement gap is needed for each combination of the frequency bands" may be configured with a bit map having a predetermined length for each combination of the frequency bands.

In the embodiment of the present disclosure, the performance report message may further include, in addition to the above-mentioned information, information indicating whether DC is supported for each combination of the frequency bands supported by the UE 1205. Herein, whether DC is supported may be reported only for a combination of frequency bands satisfying a predetermined condition. For example, in the case of a combination of the same frequency bands (or a combination having a single band entry; hereinafter, referred to as an "intra-band combination"), if whether DC is supported is not reported, it can be determined that no DC is supported for the corresponding frequency band combination. Also, in the case of a combination of different frequency bands (or a combination having two band entries or more; hereinafter, referred to as an "inter-band combination"), it can be determined that DC is supported. Also, according to an embodiment, the UE 1205 may display whether DC is supported for each combination of frequency bands, only with respect to the inter-band combination, thereby reducing the size of the message.

Meanwhile, if a predetermined event, for example, an event in which the channel quality of an arbitrary pico cell satisfies predetermined criterion occurs when the UE 1205 transmits/receives data to/from the MeNB 1210 in the area of a macro cell, the UE 1205 may create a measurement result message and transmit the measurement result message to the MeNB 1210, in operation 1230. Herein, the measurement result message may include an identifier of a cell whose channel quality satisfies the predetermined criterion, for example, a physical cell identifier (PCI or Physical Cell Id), and the channel quality (or reference signal received power) of the cell.

Also, if the MeNB 1210 receives the measurement result message from the UE 1205, the MeNB 1210 may determine that the UE 1205 is in the area of the pico cell. Then, in operation 1235, the MeNB 1210 may decide that the UE 1205 needs to additionally set the pico cell as a serving cell. Data transmission/reception through the pico cell may be efficient in many ways than data transmission/reception through a macro cell. Accordingly, if the UE 1205 is located in the area of the pico cell, it is necessary to additionally set the pico cell in which the UE 1205 is located as a serving cell.

In operation 1240, the MeNB 1210 may detect ENB (that is, SeNB 1215) controlling the pico cell with reference to the identifier of the pico cell, and transmit a control message for requesting addition of a serving cell to the SeNB 1215. The control message for requesting addition of the serving cell may include information as seen in Table 7 below.

TABLE 7

| Name | Description |
|---|---|
| SCell Id Information | Information related to the identifiers of SCells to be set by a SeNB. Configured with one or more SCellIndex-r10. In order to prevent an identifier being already used by a MeNB from being reused, the MeNB decides the SCell Id information and inform the SeNB of it. |
| TAG Id Information | Information related to the identifier of TAG to be set by the SeNB. In order to prevent an identifier being already used by the MeNB from being reused, the MeNB decides the TAG Id information and inform the SeNB of it. |
| Information Related to Uplink Scheduling | Configured with logical channel group information and priority information of logical channels set in the UE. The SeNB uses the information to interpret buffer state report information of the UE and performs uplink scheduling. |
| Information Related to Data Transfer Rate | Information about uplink/downlink expectation data transfer rate of the UE. The SeNB uses the information to determine whether to accept or reject a request for adding the Scell. |
| Information Related to DRBs to Be Serviced through the SeNB | DRB (Data Radio Bearer) is a radio bearer set to process user plane data. If the UE enters a pico cell area, it is preferable to process all user plane data or most of user plane data through the pico cell. The MeNB may notify the SeNB of information about DRBs to be processed through the pico cell, for example, PDCP setting information (for example, a PDCP header structure, a header compression protocol-related information, etc.), RLC information (RLC operation mode, various timers, etc.), logical channel-related information (logical channel identifier, priority, etc.), etc. The SeNB determines final setting information of the DRBs with reference to the information, later. |

TABLE 7-continued

| Name | Description |
|---|---|
| Channel Information of a Serving Cell Required to Be Additionally Set | The UE reports channel quality information reported through the measurement report message to the SeNB. The SeNB determines whether to accept the request for adding the serving cell, using the information, the data transfer rate-related information, etc. |

After the SeNB 1215 receives the control message for requesting the addition of the serving cell, the SeNB 1215 may determine whether to accept or reject the request for adding the serving cell, based on channel information of the serving cell, the data transfer rate-related information of the UE 1205, etc. If the SeNB 1215 determines acceptance of the request for adding the serving cell, the SeNB 1215 may set one or more DRBs, in operation 1245. Thereafter, the SeNB 1215 may process data transmitted from the UE 1205 and data that is to be transmitted to the UE 1205, through the DRBs. That the SeNB 1215 sets DRBs means that the SeNB 1215 sets a RLC layer device and a PDCP layer device to process data streams requiring predetermined Quality of Service (QoS). The configuration of the DRBs may be the same as or different from the original setting informed by the source ENB 1210.

Then, in operation 1250, the SeNB 1215 may transmit a response message including acceptance of the request for adding the serving cell to the MeNB 1210. A control message corresponding to the response message may include information as seen in Table 8 below.

TABLE 8

| Name | Description |
|---|---|
| ScellToAddMod | Information related to SCells set by the SeNB. Configured with information; SCellIndex-r10, cellIdentification-r10, radioResourceConfigCommonSCell-r10, raidoResourceConfigDedicatedSCell-r10, TAG-related information |
| PUCCH Information for pSCell | PUCCH H (Physical Uplink Control Channel) is set in at least one SCell among SCells belonging to the SCG. Uplink control information, such as HARQ feedback, CSI (Channel Status Information), SRS (Sounding Reference Signal), or SR (Scheduling Request), etc., is transmitted through the PUCCH. Hereinafter, the SCell through which the PUCCH is transmitted is referred to as "PUCCH SCell". Identifier information, PUCCH configuration information, etc. of the PUCCH SCell are the lower information of the information |
| Information for Data Forwarding | Information of a logical channel (or logical tunnel) that is to be used for data exchange between the MeNB and the SeNB. Configured with information, such as a GTP (GPRS Tunnel Protocol) tunnel identifier for exchanging downlink data and a GTP tunnel identifier for exchanging uplink data, etc. |
| Identifier of UE | C-RNTI (Cell-Radio Network Temporary Identifier) to be used by the UE in the SCell of the SCG |
| DRB Setting Information | Can be omitted if it is identical to a DRB setting used in the MeNB. |
| List of DRBs whose locations are to be reset | Can be omitted if the locations of all DRBs are reset. |
| Information Related to Scheduling Information Processing | Information related to scheduling information, such as BSR (Buffer Status Report), PHR (Power Headroom Report), etc. For example, a triggering condition, a cycle for periodical reporting, etc. The information can be omitted if it is identical to the information of the MeNB. |

Then, in operation 1255, the MeNB 1210 may receive the response message for adding the serving cell from the SeNB 1215, and stop downlink operation of the DRBs whose locations are to be reset. That is, the MeNB 1210 may stop downlink data transmission with respect to the DRBs. However, the MeNB 1210 may continue to perform uplink data processing of the DRBs. Then, in operation 1260, the MeNB 1210 may create a RRC control message instructing addition of the serving cell, and transmit the RRC control message to the UE 1205. The RRC control message instructing addition of the serving cell may include, for example, information as seen in Table 9 below.

TABLE 9

| Name | Description |
| --- | --- |
| SCellAddMod | Accommodate information transferred from the SeNB as it is. That is, the SCellAddMod is the same information as the SCellAddMod of Table 8. One SCellAddMod is accommodated for each SCell, and the information is the lower information of SCellAddModList. |
| PUCCH Information for pSCell | Accommodate information transferred from the SeNB as it is. That is, the PUCCH information for pSCell is the same as the PUCCH information for pSCell of Table 8. |
| SCG SCell List | Information related to SCells belonging to the SCG among Set SCells. May be the identifiers of the SCells or the identifiers of TAGs belonging to the SCG. |
| Identifier of UE | C-RNTI to be used by the UE in a serving cell of the SCG |
| DRB Setting Information | Information transferred from the SeNB in operation 1250 |
| List of DRBs whose Locations Are to Be Reset | Information transferred from the SeNB in operation 1250 |
| Information Related to Scheduling Information Processing | Information transferred from the SeNB in operation 1250 |
| Measurement Setting Information | Measurement object list and the related information, measurement gap setting information, measurement report setting information, etc. Measurement objects and cell group mapping information |
| DRX Setting Information | Various timer values related to DRX, values indicating the start times of the DRX cycle, etc. Parameters specified as DRX-conf in the standard 36.331. Can be signaled independently with respect to MeNB/MCG/M-MAC and SeNB/SCG/S-MAP. |

The above-mentioned information may be coded by Abstract Syntax Notation (ASN) 1 Coding, and transferred to the UE 1205.

Thereafter, in operation 1265, the UE 1205 which receives the control message may acquire downlink synchronization for the serving cell (that is, the SCell) to be newly set. Then, in operation 1270, the UE 1205 may determine whether it is ready to perform a random access process for the SCell. If the UE 1205 determines that it is ready to perform a random access process for the SCell, the UE 1205 may create a response control message for adding the serving cell, and transmit the response control message to the MeNB 1210, in operation 1275. More specifically, after the UE 1205 creates a response control message for adding the serving cell, the UE 1205 may transmit D-SR in the PCell or begin a random access process in the PCell to thus request resource assignment for transmitting the response control message for adding the serving cell. Then, if an uplink resource is assigned from a cell belonging to the MCG, the UE 1205 may use the assigned resource to transmit the response control message for adding the serving cell to the MeNB 1210.

Thereafter, in operation 1280, if the UE 1205 receives HARQ ACK or RLC ACK in response to the response control message for adding the serving cell from the SeNB 1215, the UE 1205 may begin to perform a random access process in a predetermined serving cell of the SCG. At this time, the UE 1205 may decide the predetermined serving cell of the SCG for performing the random access process by a method which will be described below.

[Method of Deciding a SCG Serving Cell for Performing the Random Access Process]

First, if there is a single serving cell for which random access-related information is set among SCG serving cells, random access may be performed in the corresponding serving cell. Also, if there are one or more serving cells for which random access-related information is set among the SCG serving cells, and a pSCell is included in the serving cells, random access may be performed in the pSCell. Herein, the random access process is a process in which the UE 1205 transmits a preamble as a predetermined frequency resource for the serving cell to a subframe, receives a response message in response to the preamble, and then performs uplink transmission according to control information of the response message.

If the random access process as described above is completed, the SeNB 1215 may determine that the UE 1205 can allow data transmission/reception in the SCell of the SCG, and start scheduling the UE 1205. More specifically, in operation 1285, the UE 1205 may perform operations, such as data transmission/reception, DRX, measurement, etc., through the MCG and SCG The measurement may be started or stopped under the control of the MeNB 1210. The UE 1205 may apply a predetermined measurement sampling cycle and a predetermined measurement report cycle to a measurement object instructed by the MeNB 1210 to be measured to thus perform measurement, and manage a representative value of the results of the measurement in RRC. The UE 1205 may perform measurement for an arbitrary measurement object at an arbitrary time, and input a representative value of the results of the measurement to the RRC in consideration of a DRX status at the corresponding time, an activated/deactivated status of the SCell set for the measurement object, a reference cell group of the measurement object, Nfreq, etc. The measurement, and the method of deciding the measurement sampling cycle and the measurement report cycle for the measurement will be able to be understood from the above description with reference to FIGS. 5 to 11.

Meanwhile, after the MeNB 1210 transmits the control message for adding the serving cell to the UE 1205, the MeNB 1210 may perform a procedure for resetting the locations of the DRBs, together with the SeNB 1215 and the S-GW 1220, in operation 1270. The procedure may include a process of transferring the data of the DRBs to be processed by the SeNB 1215 to the SeNB 1215 from the MeNB 1210, a process of releasing Evolved Packet System (EPS) bearers whose locations are to be reset among EPS bearers set between the S-GW 1220 and the MeNB 1210, and resetting the EPS bearers between the S-GW 1220 and the SeNB 1215.

In order for the SeNB 1215 to transmit/receive data quickly as possible, the UE 1205 may perform the random access procedure for the SeNB 1215 before transmitting the response message for adding the serving cell. That is, if the UE 1205 is ready to start random access in the SCell after receiving the control message for adding the serving cell, the UE 1205 may perform the random access procedure. The response message for adding the serving cell may be performed after the random access procedure is completed or while the random access procedure is performed. At this time, the UE 1205 may transmit the response message for adding the serving cell only when a uplink transmission resource for serving cells belonging to the MCG is available, so that the response message for adding the serving cell is transmitted to the MeNB 1210.

Figure 13:
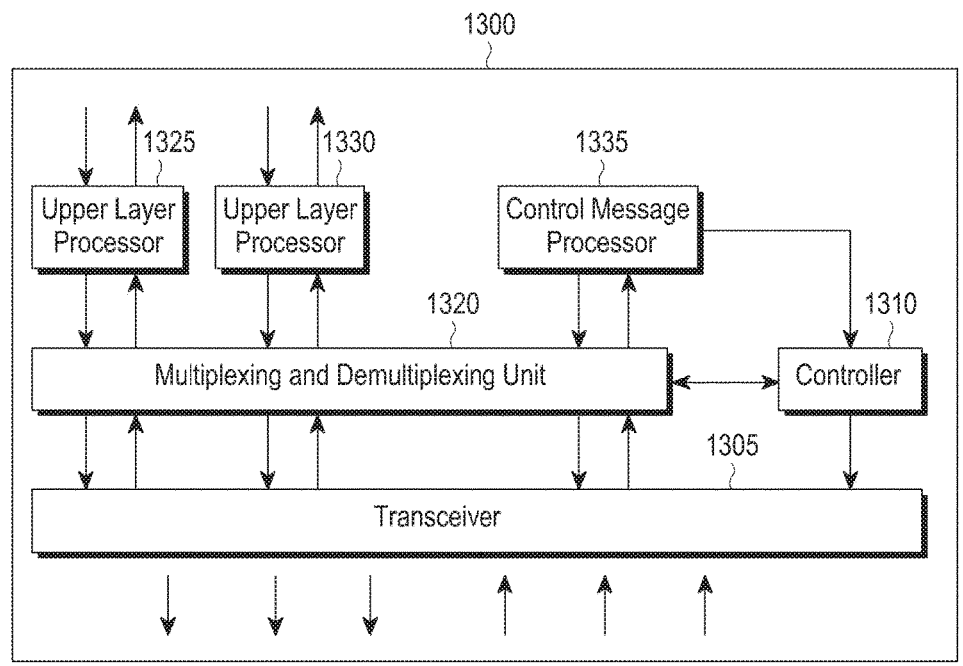
FIG. 13 is a block diagram showing a configuration example of UE according to an embodiment of the present disclosure.

FIG. 13 is a block diagram showing a configuration example of UE according to an embodiment of the present disclosure.

Referring to FIG. 13, UE 1300 according to an embodiment of the present disclosure may include a transceiver 1305, a controller 1310, a multiplexing and demultiplexing unit 1315, a control message processor 1330, and a plurality of upper layer processors 1320 and 1325. The UE 1300 may be configured with a plurality of components to perform operations according to an embodiment of the present disclosure, and the components may be integrated into a single unit or divided into a plurality of sub devices, according to other embodiments.

The transceiver 1305 may receive data and predetermined control signals through an uplink channel of a serving cell, and transmit data and predetermined control signals through a downlink channel. If a plurality of serving cells are set for the UE 1300, the transceiver 1305 may perform transmission/reception of data and transmission/reception of control signals through the plurality of serving cells. The transceiver 1305 may be configured with a plurality of RF circuits/front ends, wherein the operating frequencies of the plurality of RF circuits/front ends may be set according to the control of the controller 1310. The transceiver 1305 may perform intra-frequency measurement and inter-frequency measurement in correspondence to a predetermined measurement sampling cycle, and transfer a representative value of the results of the measurement to the controller 1310 in correspondence to a measurement report cycle.

The multiplexing and demultiplexing unit 1315 may multiplex data generated by the upper layer processors 1320 and 1325 and the control message processor 1335, and demultiplex data received by the transceiver 1305 and transfer the demultiplexed data to the upper layer processors 1320 and 1325 or the control message processor 1330.

The control message processor 1330 may be a RRC layer device, and process a control message received from ENB to perform required operation. For example, if the control message processor 1330 receives a RRC control message, the control message processor 1330 may transfer SCell setting-related information, measurement-related information, etc. to the controller 1310.

The upper layer processors 1320 and 1325 may be configured for each service. The upper layer processors 1320 and 1325 may process data generated from a user service, such as a File Transfer Protocol (FTP) or a Voice over Internet Protocol (VoIP) and transfer the processed data to the multiplexing and demultiplexing unit 1315, or may process data received from the multiplexing and demultiplexing unit 1315 and transfer the processed data to a service application which is the upper layer.

The controller 1310 may check a scheduling command (for example, uplink grant) received through the transceiver 1305, and control the transceiver 1305 and the multiplexing and demultiplexing unit 1315 to perform uplink transmission using a pre-assigned transmission resource at a time indicated by the uplink grant. The controller 1310 may also control all procedures related to SCell settings, all procedures related to measurement, etc. The controller 1310 may control UE operations described above with reference to FIGS. 3 to 12, according to the embodiment of the present disclosure.

Figure 14:
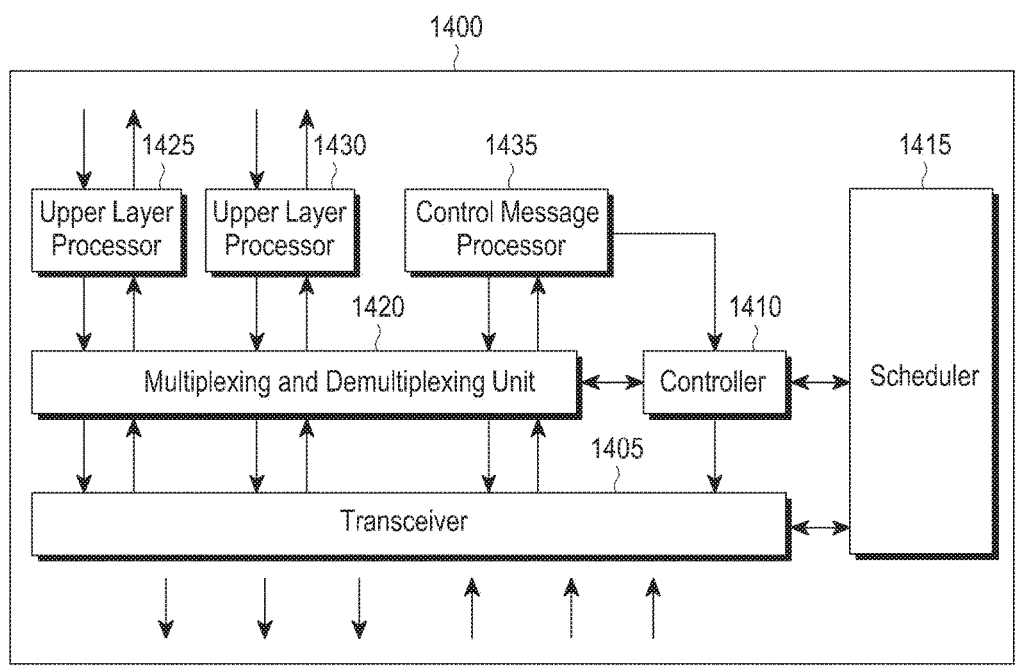
FIG. 14 is a block diagram showing a configuration example of ENB according to an embodiment of the present disclosure.

FIG. 14 is a block diagram showing a configuration example of ENB according to an embodiment of the present disclosure.

Referring to FIG. 14, ENB 1400 may include a transceiver 1405, a controller 1410, a multiplexing and demultiplexing unit 1420, a control message processor 1435, a plurality of upper layer processors 1425 and 1430, and a scheduler 1415. Likewise, the ENB 1400 may be configured with a plurality of components to perform operations according to an embodiment of the present disclosure, and the components may be integrated into a single unit or divided into a plurality of sub devices, according to other embodiments.

The transceiver 1405 may transmit data and predetermined control signals through a downlink carrier, and receive data and predetermined control signals through an uplink carrier. If a plurality of carriers are set for the ENB 1400, the transceiver 1405 may perform transmission/reception of data and transmission/reception of control signals through the plurality of carriers.

The multiplexing and demultiplexing unit 1420 may multiplex data generated by the upper layer processors 1425 and 1430 or the control message processor 1435, and demultiplex data received by the transceiver 1405 and transfer the demultiplexed data to the upper layer processors 1425 and 1430, the control message processor 1435, or the controller 1410. The control message processor 1435 may process a control message transmitted from UE to perform required operation, or create a control message to be transmitted to UE and transfer the control message to the lower layer.

The upper layer processors 1425 and 1430 may be configured for each bearer. The upper layer processors 1425 and 1430 may configure data transferred from S-GW or another ENB as RLC PDU and transfer the RLC PDU to the multiplexing and demultiplexing unit 1420, or may configure RLC PDU transferred from the multiplexing and demultiplexing unit 1420 as PDCP SDU and transfer the PDCP SDU to S-GW or another ENB.

The scheduler 1415 may assign a transmission resource to UE at an appropriate time, in consideration of the buffer status, channel status, etc. of the UE, and control the transceiver 1405 to process a signal transmitted from the UE or to transmit a signal to the UE.

The controller 1410 may control all procedures related to SCell settings, all procedures related to measurement, etc. The controller 1310 may control ENB operations among operations described above with reference to FIGS. 3 to 12.

Definitions of the following terms used in the present disclosure may follow the standard 36.211, 212, and 213.

PUCCH, CSI, CQI, PUSCH, PDSCH, HARQ feedback, Uplink Grant, Downlink Assignment, and Uplink Control Information (UCI)

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for performing an intra-frequency measurement by a user equipment (UE) served by a master cell group (MCG) and a secondary cell group (SCG), the method comprising:
    identifying whether an MCG discontinuous reception (DRX) is in use or an SCG DRX is in use;
    if the MCG DRX is in use, performing an intra-frequency measurement on a primary cell (PCell) with a first period determined based on an MCG DRX cycle; and
    if the SCG DRX is in use, performing an intra-frequency measurement on a primary secondary cell (PSCell) with a second period determined based on an SCG DRX cycle.

2. The method of claim 1, wherein the PSCell is configured to receive control information for cells in the SCG from the UE.

3. The method of claim 1, wherein the MCG includes at least one cell controlled by a base station which controls the PCell.

4. A user equipment (UE) served by a master cell group (MCG) and a secondary cell group (SCG), the UE comprising:
    a transceiver; and
    a processor coupled to the transceiver, wherein the processor is configured to:
        identify whether an MCG discontinuous reception (DRX) is in use or an SCG DRX is in use,
        if the MCG DRX is in use, perform an intra-frequency measurement on a primary cell (PCell) with a first period determined based on an MCG DRX cycle, and
        if the SCG DRX is in use, perform an intra-frequency measurement on a primary secondary cell (PSCell) with a second period determined based on an SCG DRX cycle.

5. The UE of claim 4, wherein the PSCell is configured to receive control information for cells in the SCG from the UE.

6. The method of claim 4, wherein the MCG includes at least one cell controlled by a base station which controls the PCell.

* * * * *